US012795693B2

(12) United States Patent
Ganesan et al.

(10) Patent No.: US 12,795,693 B2
(45) Date of Patent: Nov. 10, 2026

(54) SIDELINK RESOURCE POOL CONFIGURATION

(71) Applicant: Lenovo (Singapore) Pte. Ltd., New Tech Park (SG)

(72) Inventors: Karthikeyan Ganesan, Kronberg im Taunus (DE); Robin Thomas, Bad Nauheim (DE); Ankit Bhamri, Rödermark (DE); Ali Ramadan Ali, Kraiburg am Inn (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 393 days.

(21) Appl. No.: 18/000,213

(22) PCT Filed: May 28, 2021

(86) PCT No.: PCT/IB2021/054722

§ 371 (c)(1),
(2) Date: Nov. 29, 2022

(87) PCT Pub. No.: WO2021/240478

PCT Pub. Date: Dec. 2, 2021

(65) Prior Publication Data

US 2023/0199802 A1 Jun. 22, 2023

Related U.S. Application Data

(60) Provisional application No. 63/032,225, filed on May 29, 2020, provisional application No. 63/032,286, filed on May 29, 2020.

(51) Int. Cl.
*H04W 72/25* (2023.01)
*H04L 5/00* (2006.01)
(Continued)

(52) U.S. Cl.
CPC ........... *H04W 72/25* (2023.01); *H04L 5/0048* (2013.01); *H04L 5/0051* (2013.01); *H04W 64/00* (2013.01); *H04W 92/18* (2013.01)

(58) Field of Classification Search
CPC ..... H04W 72/25; H04W 64/00; H04W 92/18; H04L 5/0048; H04L 5/0051
See application file for complete search history.

(56) References Cited

U.S. PATENT DOCUMENTS

2019/0230618 A1* 7/2019 Saur .................... H04W 56/001
2020/0028648 A1 1/2020 Akkarakaran et al.
(Continued)

FOREIGN PATENT DOCUMENTS

EP 3796587 B1 10/2023
KR 20170036736 A 4/2017
(Continued)

OTHER PUBLICATIONS

PCT/IB2021/054723, "Notification of Transmittal of the International Search Report and the Written Opinion of the International Searching Authority, or the Declaration", International Searching Authority, Sep. 27, 2021, pp. 1-14.
(Continued)

*Primary Examiner* — Faruk Hamza
*Assistant Examiner* — Tito Q Pham
(74) *Attorney, Agent, or Firm* — Kunzler Needham Hilton

(57) ABSTRACT

Apparatuses, methods, and systems are disclosed for sidelink resource pool configuration. One method includes receiving configuration information including a configuration for a sidelink resource pool for a positioning reference signal. The sidelink resource pool includes: a common resource pool for data and a sidelink positioning reference signal; or a resource pool for only the sidelink positioning reference signal. The method includes transmitting sidelink
(Continued)

assistance data to a user equipment for sidelink positioning reference signal transmission. The sidelink assistance data corresponds to the configuration for the sidelink resource pool. The method includes receiving a sidelink positioning report from the user equipment.

13 Claims, 14 Drawing Sheets

(51) Int. Cl.
*H04W 64/00* (2009.01)
*H04W 92/18* (2009.01)

(56) References Cited

U.S. PATENT DOCUMENTS

| | | | | |
|---|---|---|---|---|
| 2020/0037343 | A1* | 1/2020 | He | H04W 72/20 |
| 2020/0154240 | A1* | 5/2020 | Edge | H04W 4/029 |
| 2021/0006372 | A1 | 1/2021 | Cha et al. | |
| 2021/0410084 | A1* | 12/2021 | Li | H04W 52/265 |
| 2022/0183002 | A1* | 6/2022 | Yeo | H04L 1/1854 |
| 2022/0210801 | A1* | 6/2022 | Xu | H04W 72/542 |
| 2022/0278797 | A1* | 9/2022 | Lee | H04W 92/18 |
| 2022/0317229 | A1 | 10/2022 | Baek et al. | |
| 2023/0035261 | A1* | 2/2023 | Duan | H04W 4/025 |
| 2023/0146161 | A1* | 5/2023 | Sun | H04W 74/0816 370/329 |
| 2023/0209494 | A1* | 6/2023 | Dai | H04W 64/00 455/456.6 |
| 2023/0221397 | A1 | 7/2023 | Baek et al. | |

FOREIGN PATENT DOCUMENTS

| | | | |
|---|---|---|---|
| KR | 20200050901 | A | 5/2020 |
| WO | 2016048510 | A1 | 3/2016 |
| WO | 2019036578 | A1 | 2/2019 |
| WO | 2020033088 | A1 | 2/2020 |
| WO | 2020091545 | A1 | 7/2020 |

OTHER PUBLICATIONS

PCT/IB2021/054722, "Notification of Transmittal of the International Search Report and the Written Opinion of the International Searching Authority, or the Declaration", International Searching Authority, Oct. 8, 2021, pp. 1-13.

Huawei et al., "Discussion of sidelink positioning", 3GPP TSG RAN WG1 #101-e R1-2004609, May 25-Jun. 5, 2020, pp. 1-5.

3GPP, "3rd Generation Partnership Project; Technical Specification Group Services and System Aspects; Service requirements for the 5G system; Stage 1 (Release 17)", 3GPP TS 22.261 V17.2.0, Mar. 2020, pp. 1-83.

3GPP, "3rd Generation Partnership Project; Technical Specification Group Radio Access Network; LTE Positioning Protocol (LPP) (Release 16)", 3GPP TS 37.355 V16.0.0, Mar. 2020, pp. 1-281.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; NR; Physical layer measurements (Release 16)", 3GPP TS 38.215 V16.1.0, Mar. 2020, pp. 1-22.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, Mar. 2020, pp. 1-107.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

U.S. Appl. No. 18/000,261, "Office Action Summary", US Patent Office, Dec. 17, 2024, pp. 1-15.

U.S. Appl. No. 18/000,261, "Office Action Summary", United States Patent and Trademark Office, Jun. 20, 2025, pp. 1-17.

M. Feng et al., "Dealing with Limited Backhaul Capacity in Millimeter-Wave Systems: A Deep Reinforcement Learning Approach", IEEE Communications Magazine, Mar. 2019, pp. 50-55.

Vodafone, "Summary of email discussion on NR V2X study item", 3GPP TSG RAN #79 RP-180426, Mar. 19-22, 2018, pp. 1-27.

* cited by examiner

SIDELINK RESOURCE POOL CONFIGURATION

CROSS-REFERENCE TO RELATED APPLICATIONS

This application claims priority to U.S. Patent Application Ser. No. 63/032,225 entitled "APPARATUSES, METHODS, AND SYSTEMS FOR SL PRS RESOURCE POOL CONFIGURATION" and filed on May 29, 2020 for Karthikeyan Ganesan, and U.S. Patent Application Ser. No. 63/032,286 entitled "APPARATUSES, METHODS, AND SYSTEMS FOR SL PRS ALLOCATION PROCEDURE" and filed on May 29, 2020 for Karthikeyan Ganesan, all of which are incorporated herein by reference in their entirety.

FIELD

The subject matter disclosed herein relates generally to wireless communications and more particularly relates to sidelink resource pool configuration.

BACKGROUND

In certain wireless communications networks, a sidelink positioning reference signal may be made. There may be various configurations of the sidelink positioning reference signal.

BRIEF SUMMARY

Methods for sidelink resource pool configuration are disclosed. Apparatuses and systems also perform the functions of the methods. One embodiment of a method includes receiving configuration information including a configuration for a sidelink resource pool for a positioning reference signal. The sidelink resource pool includes: a common resource pool for data and a sidelink positioning reference signal; or a resource pool for only the sidelink positioning reference signal. In some embodiments, the method includes transmitting sidelink assistance data to a user equipment for sidelink positioning reference signal transmission. The sidelink assistance data corresponds to the configuration for the sidelink resource pool. In certain embodiments, the method includes receiving a sidelink positioning report from the user equipment.

One apparatus for sidelink resource pool configuration includes a receiver that receives configuration information including a configuration for a sidelink resource pool for a positioning reference signal. The sidelink resource pool includes: a common resource pool for data and a sidelink positioning reference signal; or a resource pool for only the sidelink positioning reference signal. In certain embodiments, the apparatus includes a transmitter that transmits sidelink assistance data to a user equipment for sidelink positioning reference signal transmission.

The sidelink assistance data corresponds to the configuration for the sidelink resource pool. The receiver receives a sidelink positioning report from the user equipment.

Another embodiment of a method for sidelink resource pool configuration includes determining, at a user equipment, that a sidelink transmission buffer is empty for a destination. In some embodiments, the method includes receiving sidelink assistance data at a user equipment for sidelink positioning reference signal transmission. The sidelink assistance data corresponds to a configuration for a sidelink resource pool. The sidelink resource pool includes: a common resource pool for data and a sidelink positioning reference signal; or a resource pool for only the sidelink positioning reference signal. In certain embodiments, the method includes transmitting a sidelink positioning report from the user equipment.

Another apparatus for sidelink resource pool configuration includes a receiver that receives sidelink assistance data at the user equipment for sidelink positioning reference signal transmission. The sidelink assistance data corresponds to a configuration for a sidelink resource pool. The sidelink resource pool includes: a common resource pool for data and a sidelink positioning reference signal; or a resource pool for only the sidelink positioning reference signal. In some embodiments, the apparatus includes a transmitter that transmits a sidelink positioning report from the user equipment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
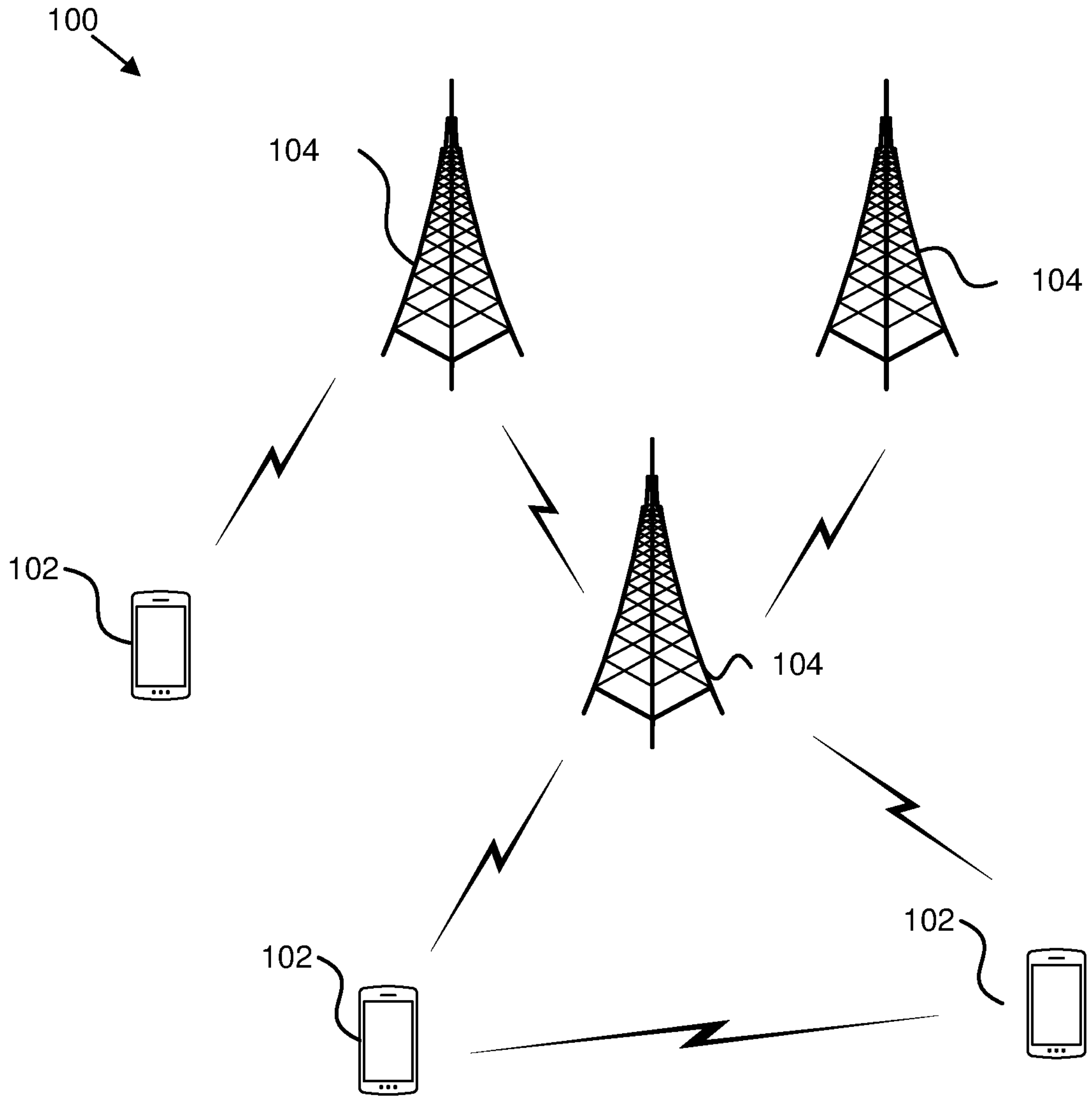
FIG. 1 is a schematic block diagram illustrating one embodiment of a wireless communication system for sidelink resource pool configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for sidelink resource pool configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), a location management function ("LMF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units

104 transmit DL communication signals to serve the remote units 102 in the time, frequency, and/or spatial domain.

In various embodiments, a network unit 104 may receive configuration information including a configuration for a sidelink resource pool for a positioning reference signal. The sidelink resource pool includes: a common resource pool for data and a sidelink positioning reference signal; or a resource pool for only the sidelink positioning reference signal. In some embodiments, the network unit 104 may transmit sidelink assistance data to a user equipment for sidelink positioning reference signal transmission. The sidelink assistance data corresponds to the configuration for the sidelink resource pool. In certain embodiments, the network unit 104 may receive a sidelink positioning report from the user equipment. Accordingly, the network unit 104 may be used for sidelink resource pool configuration.

In certain embodiments, a remote unit 102 may receive sidelink assistance data at a user equipment for sidelink positioning reference signal transmission. The sidelink assistance data corresponds to a configuration for a sidelink resource pool. The sidelink resource pool includes: a common resource pool for data and a sidelink positioning reference signal; or a resource pool for only the sidelink positioning reference signal. In some embodiments, the remote unit 102 may transmit a sidelink positioning report from the user equipment. Accordingly, the remote unit 102 may be used for security capabilities in an encryption key request.

Figure 2:
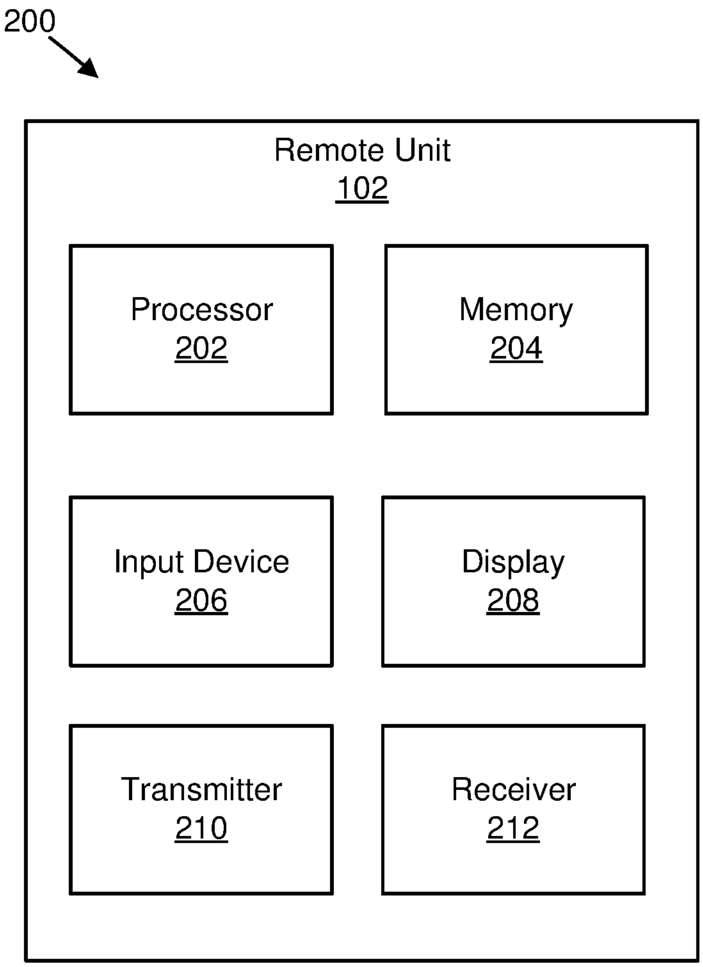
FIG. 2 is a schematic block diagram illustrating one embodiment of an apparatus that may be used for sidelink resource pool configuration.

FIG. 2 depicts one embodiment of an apparatus 200 that may be used for sidelink resource pool configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the receiver 212 may receive sidelink assistance data at the user equipment for sidelink positioning reference signal transmission. The sidelink assistance data corresponds to a configuration for a sidelink resource pool. The sidelink resource pool includes: a common resource pool for data and a sidelink positioning reference signal; or a resource pool for only the sidelink positioning reference signal. In various embodiments, the transmitter 210 may transmit a sidelink positioning report from the user equipment.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
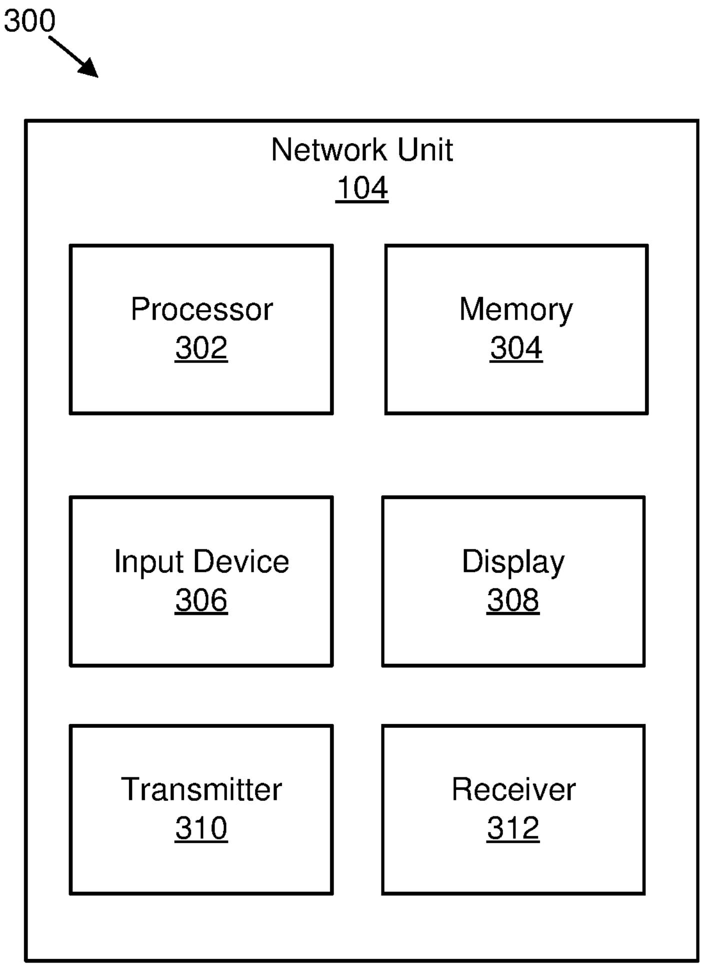
FIG. 3 is a schematic block diagram illustrating one embodiment of an apparatus that may be used for sidelink resource pool configuration.

FIG. 3 depicts one embodiment of an apparatus 300 that may be used for sidelink resource pool configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor

202, the memory 204, the input device 206, the display 208, the transmitter 210, and the receiver 212 of the remote unit 102, respectively.

In certain embodiments, the receiver 312 may receive configuration information including a configuration for a sidelink resource pool for a positioning reference signal. The sidelink resource pool includes: a common resource pool for data and a sidelink positioning reference signal; or a resource pool for only the sidelink positioning reference signal. In various embodiments, the transmitter 310 may transmit sidelink assistance data to a user equipment for sidelink positioning reference signal transmission. The sidelink assistance data corresponds to the configuration for the sidelink resource pool. In some embodiments, the receiver 312 receives a sidelink positioning report from the user equipment.

In some embodiments, a sidelink positioning method may be used to help with precise positioning measurement for an indoor factory environment and/or for vehicle positioning. In various embodiments, accuracy and the latency requirements may vary between an indoor factory environment and vehicle to everything ("V2X") communications. In certain embodiments, sidelink adds another dimension by calculating relative positioning/ranging between objects and/or vehicles. In such embodiments, a number of anchor nodes transmitting reference signals on sidelink ("SL") for positioning (e.g., SL positioning reference signals ("PRS")) may play an important role for high accuracy positioning. In some embodiments, there may be a method of configuring a resource pool structure for reference signals for SL positioning, a method for resource allocation and transmitting reference signals with mode 1, and/or interworking between UE to network interface ("Uu") and SL positioning to achieve high accuracy positioning.

In certain embodiments, sidelink resource pools may be used for transmitting only SL data, and mode 2 resource allocation (e.g., UE autonomous resource allocation) and mode 1 resource allocation (e.g., gNB resource allocation) may be used for SL data transmission. In some embodiments, system configuration of resource pools and/or resource allocation methods may be used for the transmission of reference signals on SL for positioning.

As used herein, the terms eNB and/or gNB may be used for a base station but may be replaceable by any other radio access node (e.g., base station ("BS"), eNB, gNB, AP, NR, and so forth). Moreover, embodiments described herein may be described in the context of 5G NR; however, they may be applicable to other mobile communication systems supporting serving cells and/or carriers configured for sidelink communication over a UE to UE interface (e.g., PC5 interface).

It should be noted that, while SL PRS may be used in some embodiments, SL positioning may be estimated with any SL reference signal ("RS"). In various embodiments, in a type of SL RS to be used for a positioning estimate may be provided to a user equipment ("UE"). As an example, configuration of different PRS types may be PRS type 1-pseudo random sequence (e.g., based on gold sequence), PRS type 2-Zadoff-chu sequence (e.g., generalized chirp like sequence), and PRS type 3-pulse based sequence.

In certain embodiments, there may be an anchor UE (e.g., a UE whose own position is known accurately). In some embodiments, there may be non-Anchor UEs (e.g., UEs with unknown position and/or location information).

In various embodiments, there may be a SL PRS resource pool configuration that includes message exchanges between a gNB, an LMF, a V2X layer, and SL UEs. In certain embodiments, there may be message exchanges between a gNB and an LMF about a sidelink resource pool configuration and a type of RS used to estimate positioning by UEs. In some embodiments, a gNB may configure a sidelink resource pool for PRS in two ways: 1) common resource pool for data and SL PRS (e.g., semi-static & dynamic multiplexing); or 2) a SL PRS only resource pool.

In certain embodiments, a gNB may semi-statically partition SL PRS and SL data in different subchannels (e.g., SL PRS and SL data are in different subcarrier frequencies and the gNB may provide LMF information indicating subchannels that may be used for SL PRS transmission and subchannels used for SL PRS transmission are not multiplexed with any other sidelink physical data channel).

In some embodiments, a gNB may allow dynamic multiplexing of SL PRS and SL data in different sub-channels. In such embodiments, a transmit ("TX") UE may determine subchannels for SL PRS transmission using mode 1 resource allocation or mode 2 resource allocation. In various embodiments, a gNB may allocate a separate SL PRS resource pool for mode 1 and mode 2. In certain embodiments, a resource pool configuration for transmission of SL positioning reports may be shared between a gNB and a LMF and may be shared with surrounding UEs.

In various embodiments, a resource pool bandwidth for SL PRS transmission or SL PRS bandwidth may be configured across SL bandwidth parts ("BWPs") and/or SL carriers for wideband SL PRS transmission. In certain embodiments, resource pool and/or SL PRS bandwidth for each carrier may be provided and multiple sidelink carriers may be configured per UE for SL PRS transmissions. In some embodiments, a number of symbols used in a slot for SL PRS transmission may be configured. In such embodiments, the following may also be configured: a SL PRS frequency offset corresponding to each member in a group for transmission in a time slot (e.g., subcarrier offset between SL PRS corresponding to each group member in the frequency domain), a SL PRS comb pattern corresponding to a time and frequency domain pattern, a SL PRS periodicity, a repetition pattern, a repetition factor, SL PRS transmit power related parameters, and/or a muting pattern.

In certain embodiments, a message exchange between a LMF and a V2X layer may include a positioning destination identifier ("ID"), a destination group ID, a group size, and/or a member ID since V2X groups may be formed at a higher layer. In such embodiments, anchor and non-anchor members for SL PRS transmission may be indicated. Moreover, in such embodiments, member information may be provided with respect to longitudinal and lateral directions so that a TX UE may include corresponding members depending on whether longitudinal and lateral estimates are needed. In some embodiments, anchor UEs positioning information may be shared between an LMF and a V2X layer. In various embodiments, longitudinal positioning estimates may include location information transmitted between vehicles (e.g., range information for maintaining a safe following distance). In certain embodiments, lateral positioning estimates may include location information for lane keeping, or location awareness with respect to a vehicle.

In some embodiments, a gNB may provide a LMF with a destination ID, destination group ID, group size, or member ID that also includes anchor and non-anchor members for SL PRS transmission and may include an external interface that provides information to the LMF indicating one or more parameters. In various embodiments, a combination of any parameters described herein may be provided to an LMF.

In certain embodiments, a LMF may signal a SL PRS configuration to a TX UE via unicast or broadcast SL assistance data. In such embodiments, the SL assistance data may include a mapping of positioning accuracy and latency to priority and remaining packet delay budget ("PDB"), SL PRS transmission occasions per resource pool, a number of subchannels of SL PRS transmission per resource pool, a SL positioning technique (e.g., time difference of arrival ("TDOA"), angle of departure ("AoD"), and so forth), a SL positioning type (e.g., model A, model B, or model C), a report configuration, source-destination ID information for SL PRS transmission, a source-destination group ID, a minimum communication range ("MCR"), an anchor UE's positioning information (e.g., depends on network or UE based positioning or relative positioning) and so forth. In some embodiments, LTE positioning protocol ("LPP") signaling with respect to a SL PRS bandwidth, a transmission occasion, a positioning method, and so forth may be applicable only for a certain destination group ID, where a TX UE may localize itself. In various embodiments, if position information of an anchor UE is not provided by a LMF, then a TX UE may report only relative positioning.

In various embodiments, model information in signaling may means SL PRS transmission from one-to-one (e.g., TX UE to RX UE), one-to-many (e.g., TX UE to multiple RX UEs), many-to-one (e.g., RX UEs to a TX UE), and/or bidirectional SL PRS transmission. In certain embodiments, LPP signaling and/or gNB downlink signaling may indicate a model to be used for SL positioning and/or a SL positioning technique.

Figure 4:
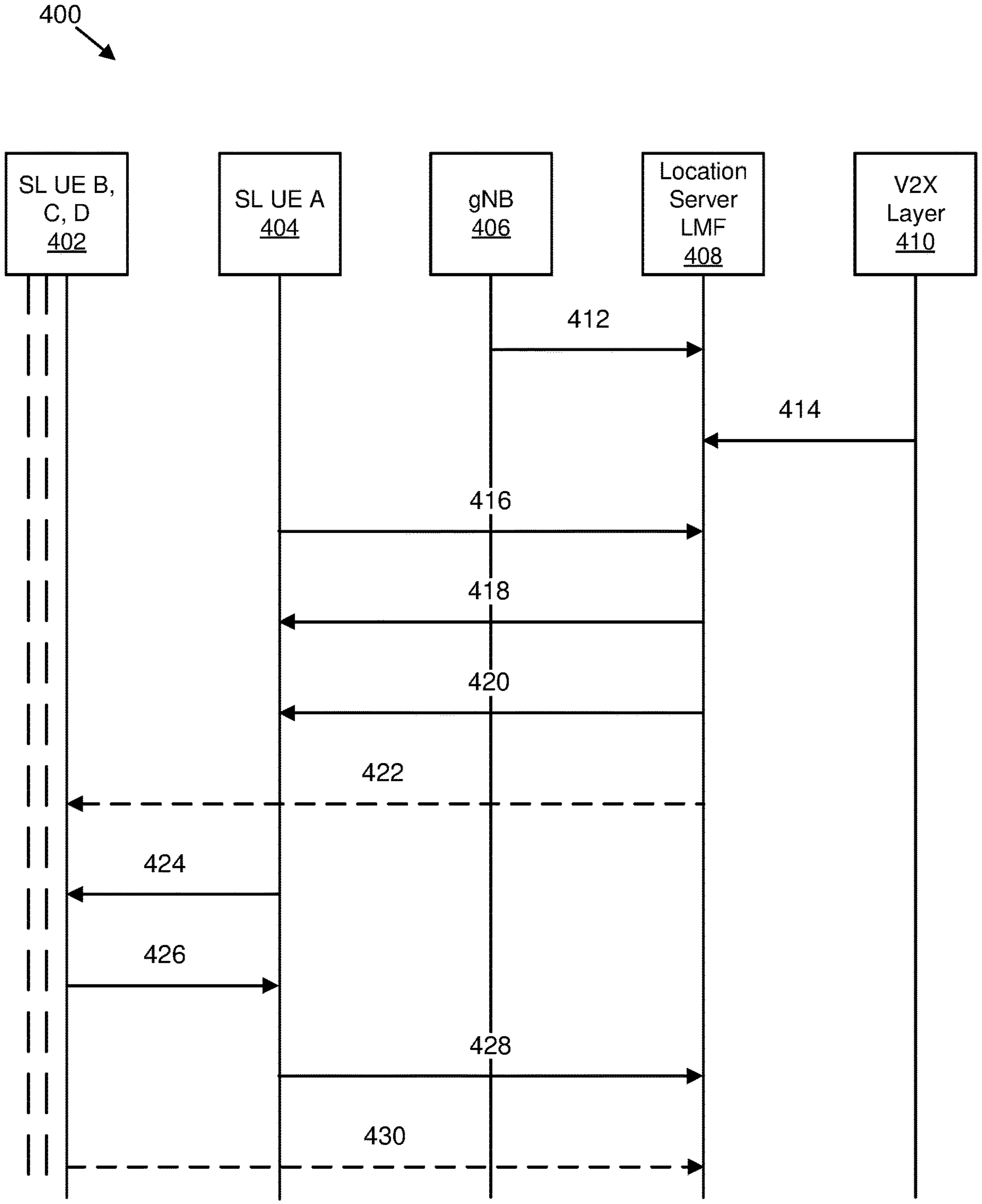
FIG. 4 is a network communication diagram illustrating one embodiment of network based UE assisted positioning.

FIG. 4 is a network communication diagram 400 illustrating one embodiment of network based UE assisted positioning. The diagram 400 illustrates a SL UE B, C, and/or D 402, a SL UE A 404, a gNB 406, a location server LMF 408, and a V2X layer 410. As may be appreciated, each of the illustrated messages may include one or more messages.

In a first communication 412 transmitted between the gNB 406 and the location server LMF 408, the gNB 406 transmits a SL resource pool configuration and/or SL RS (e.g., using an NR positioning protocol A ("NRPPa") protocol) to the location server LMF 408.

In a second communication 414 transmitted from the V2X layer 410 to the location server LMF 408, the V2X layer 410 transmits a group size, destination ID, member ID, and/or an MCR to the location server LMF 408.

In a third communication 416 transmitted from the SL UE A 404 to the location server LMF 408, the SL UE A 404 transmits UE assistance information for SL positioning (e.g., onboard metrics such as velocity, speed, heading, neighboring UEs, and so forth) (e.g., using an LPP protocol) to the location server LMF 408.

In a fourth communication 418 transmitted from the location server LMF 408 to the SL UE A 404, the location server LMF 408 transmits a request for SL positioning (e.g., absolute and/or relative positioning model, network ("NW") and/or UE based source-destination IDs) (e.g., using an LPP protocol) to the SL UE A 404.

In a fifth communication 420 transmitted from the location server LMF 408 to the SL UE A 404, the location server LMF 408 transmits assistance information for SL positioning (e.g., SL RS, occasion, repetition, COMB pattern, subchannel size, bandwidth ("BW"), positioning technique, report type) (e.g., using an LPP protocol) to the SL UE A 404.

In an optional sixth communication 422 transmitted from the location server LMF 408 to the SL UE B, C, and/or D 402, the location server LMF 408 transmits assistance information for SL positioning (e.g., SL RS, occasion, repetition, COMB pattern, subchannel size, bandwidth ("BW"), positioning technique, report type) (e.g., using an LPP protocol) to the SL UE B, C, and/or D 402.

In a seventh communication 424 transmitted from the SL UE A 404 to the SL UE B, C, and/or D 402, the SL UE A 404 transmits a SL PRS transmission to the SL UE B, C, and/or D 402, and in an eighth communication 426 transmitted from the SL UE B, C, and/or D 402 to the SL UE A 404, the SL UE B, C, and/or D 402 transmits a position report to the SL UE A 404. The seventh communication 424 and the eighth communication 426 may be considered model A.

In a nineth communication 428 transmitted from the SL UE A 404 to the location server LMF 408, the SL UE A 404 transmits a report for SL positioning to the location server LMF 408. In an optional tenth communication 430 transmitted from the SL UE B, C, and/or D 402 to the location server LMF 408, the SL UE B, C, and/or D 402 transmits a report for SL positioning to the location server LMF 408.

Figure 5:
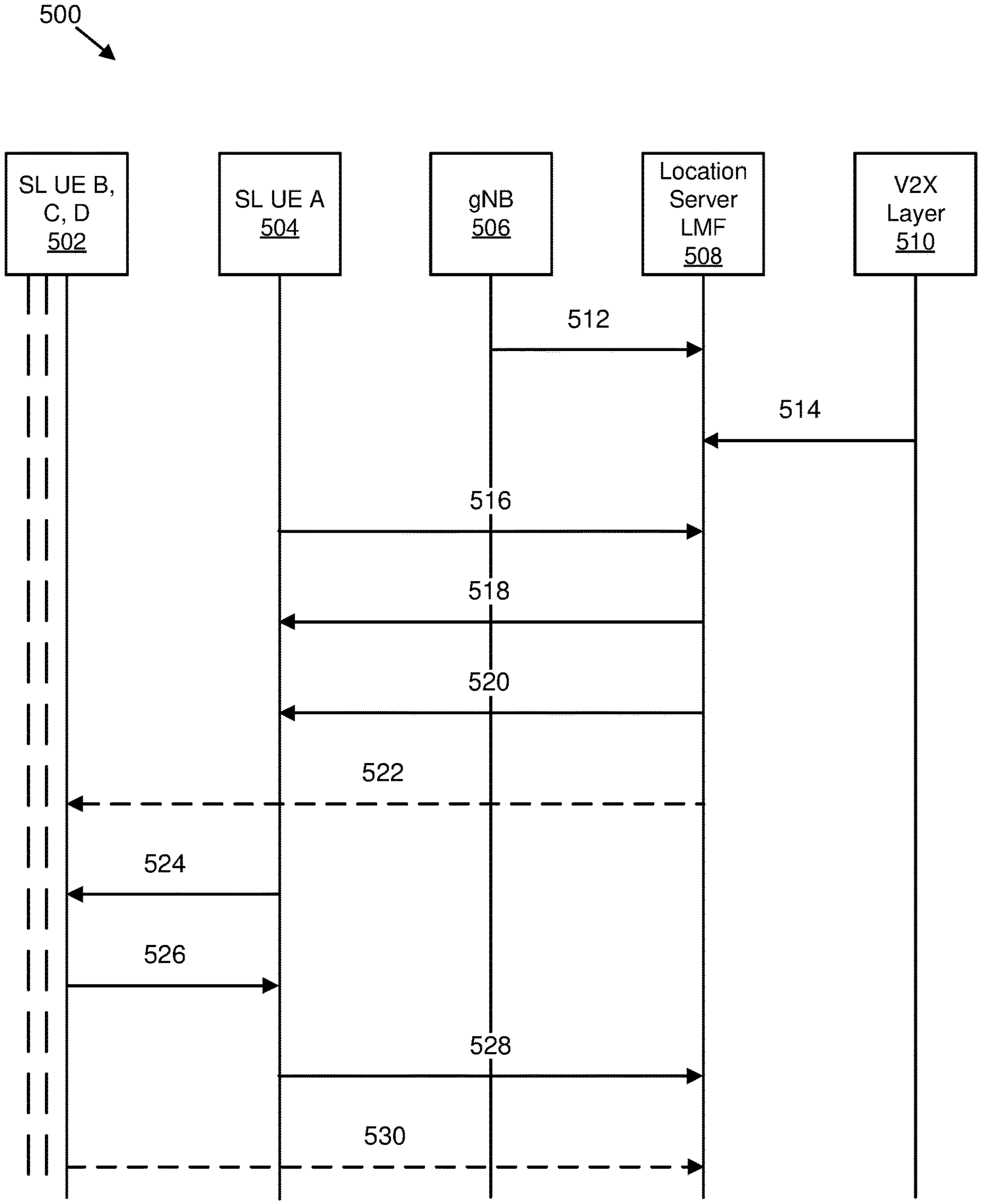
FIG. 5 is a network communication diagram illustrating another embodiment of network based UE assisted positioning.

FIG. 5 is a network communication diagram 500 illustrating another embodiment of network based UE assisted positioning. The diagram 500 illustrates a SL UE B, C, and/or D 502, a SL UE A 504, a gNB 506, a location server LMF 508, and a V2X layer 510. As may be appreciated, each of the illustrated messages may include one or more messages.

In a first communication 512 transmitted between the gNB 506 and the location server LMF 508, the gNB 506 transmits a SL resource pool configuration and/or SL RS (e.g., using an NRPPa protocol) to the location server LMF 508.

In a second communication 514 transmitted from the V2X layer 510 to the location server LMF 508, the V2X layer 510 transmits a group size, destination ID, member ID, and/or an MCR to the location server LMF 508.

In a third communication 516 transmitted from the SL UE A 504 to the location server LMF 508, the SL UE A 504 transmits UE assistance information for SL positioning (e.g., onboard metrics such as velocity, speed, heading, neighboring UEs, and so forth) (e.g., using an LPP protocol) to the location server LMF 508.

In a fourth communication 518 transmitted from the location server LMF 508 to the SL UE A 504, the location server LMF 508 transmits a request for SL positioning (e.g., absolute and/or relative positioning model, NW and/or UE based source-destination IDs) (e.g., using an LPP protocol) to the SL UE A 504.

In a fifth communication 520 transmitted from the location server LMF 508 to the SL UE A 504, the location server LMF 508 transmits assistance information for SL positioning (e.g., SL RS, occasion, repetition, COMB pattern, subchannel size, BW, positioning technique, report type) (e.g., using an LPP protocol) to the SL UE A 504.

In an optional sixth communication 522 transmitted from the location server LMF 508 to the SL UE B, C, and/or D 502, the location server LMF 508 transmits assistance information for SL positioning (e.g., SL RS, occasion, repetition, COMB pattern, subchannel size, BW, positioning technique, report type) (e.g., using an LPP protocol) to the SL UE B, C, and/or D 502.

In a seventh communication 524 transmitted from the SL UE A 504 to the SL UE B, C, and/or D 502, the SL UE A 504 transmits a SL PRS transmission request and/or trigger to the SL UE B, C, and/or D 502, and in an eighth communication 526 transmitted from the SL UE B, C, and/or D 502 to the SL UE A 504, the SL UE B, C, and/or D 502 transmits a PRS transmission to the SL UE A 504. The seventh communication 524 and the eighth communication 526 may be considered model B.

In a nineth communication 528 transmitted from the SL UE A 504 to the location server LMF 508, the SL UE A 504 transmits a report for SL positioning to the location server LMF 508. In an optional tenth communication 530 transmitted from the SL UE B, C, and/or D 502 to the location server LMF 508, the SL UE B, C, and/or D 502 transmits a report for SL positioning to the location server LMF 508.

Figure 6:
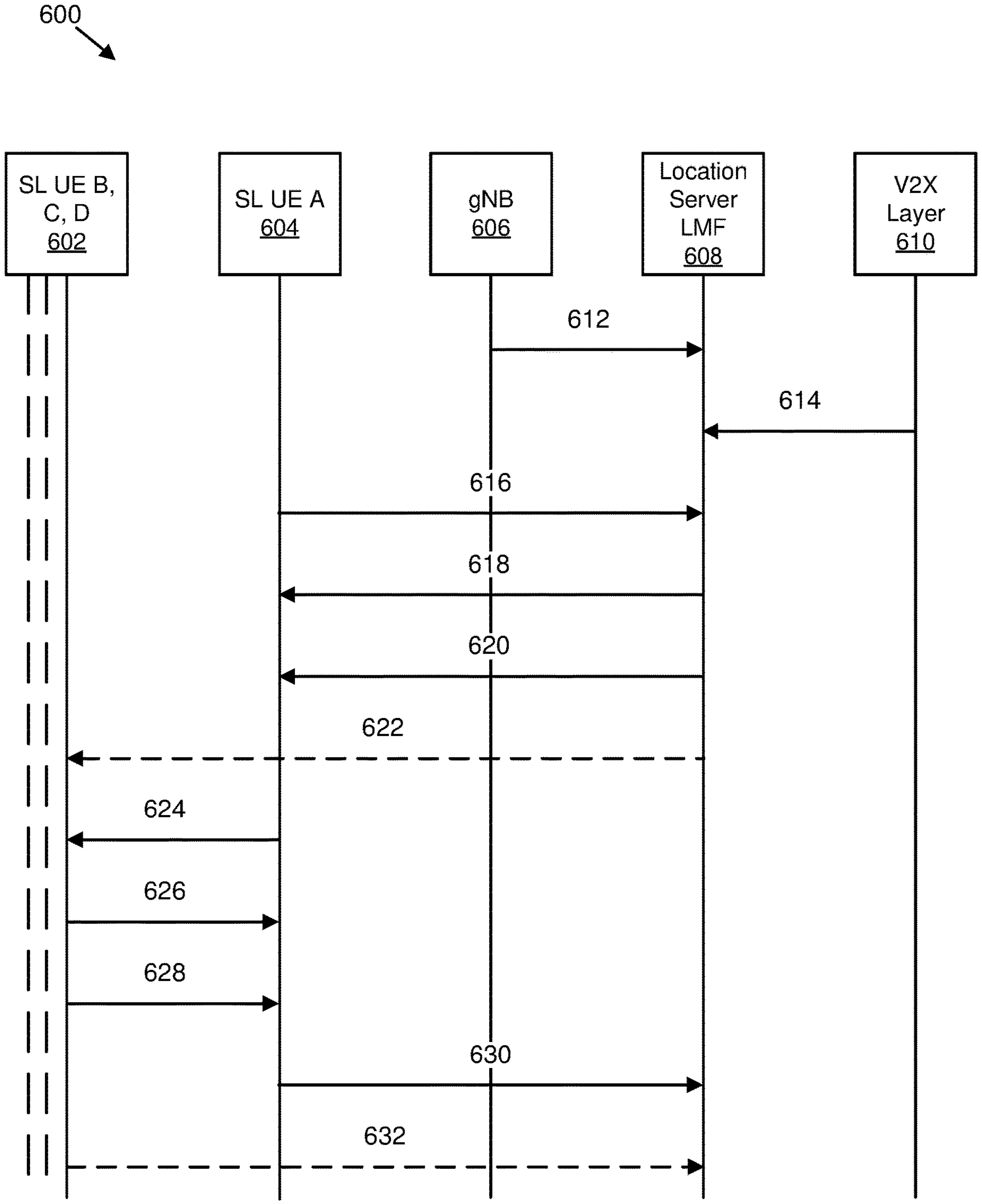
FIG. 6 is a network communication diagram illustrating a further embodiment of network based UE assisted positioning.

FIG. 6 is a network communication diagram 600 illustrating a further embodiment of network based UE assisted positioning. The diagram 600 illustrates a SL UE B, C, and/or D 602, a SL UE A 604, a gNB 606, a location server LMF 608, and a V2X layer 610. As may be appreciated, each of the illustrated messages may include one or more messages.

In a first communication 612 transmitted between the gNB 606 and the location server LMF 608, the gNB 606 transmits a SL resource pool configuration and/or SL RS (e.g., using an NRPPa protocol) to the location server LMF 608.

In a second communication 614 transmitted from the V2X layer 610 to the location server LMF 608, the V2X layer 610 transmits a group size, destination ID, member ID, and/or an MCR to the location server LMF 608.

In a third communication 616 transmitted from the SL UE A 604 to the location server LMF 608, the SL UE A 604 transmits UE assistance information for SL positioning (e.g., onboard metrics such as velocity, speed, heading, neighboring UEs, and so forth) (e.g., using an LPP protocol) to the location server LMF 608.

In a fourth communication 618 transmitted from the location server LMF 608 to the SL UE A 604, the location server LMF 608 transmits a request for SL positioning (e.g., absolute and/or relative positioning model, NW and/or UE based source-destination IDs) (e.g., using an LPP protocol) to the SL UE A 604.

In a fifth communication 620 transmitted from the location server LMF 608 to the SL UE A 604, the location server LMF 608 transmits assistance information for SL positioning (e.g., SL RS, occasion, repetition, COMB pattern, subchannel size, BW, positioning technique, report type) (e.g., using an LPP protocol) to the SL UE A 604.

In an optional sixth communication 622 transmitted from the location server LMF 608 to the SL UE B, C, and/or D 602, the location server LMF 608 transmits assistance information for SL positioning (e.g., SL RS, occasion, repetition, COMB pattern, subchannel size, BW, positioning technique, report type) (e.g., using an LPP protocol) to the SL UE B, C, and/or D 602.

In a seventh communication 624 transmitted from the SL UE A 604 to the SL UE B, C, and/or D 602, the SL UE A 604 transmits a SL PRS transmission and a SL PRS transmission request and/or trigger to the SL UE B, C, and/or D 602, in an eighth communication 626 transmitted from the SL UE B, C, and/or D 602 to the SL UE A 604, the SL UE B, C, and/or D 602 transmits a PRS transmission to the SL UE A 604, and in a nineth communication 628 transmitted from the SL UE B, C, and/or D 602 to the SL UE A 604, the SL UE B, C, and/or D 602 transmits a position report to the SL UE A 604. The seventh communication 624, the eighth communication 626, and the nineth communication 628 may be considered model C.

In a tenth communication 630 transmitted from the SL UE A 604 to the location server LMF 608, the SL UE A 604 transmits a report for SL positioning to the location server LMF 608. In an optional eleventh communication 632 transmitted from the SL UE B, C, and/or D 602 to the location server LMF 608, the SL UE B, C, and/or D 602 transmits a report for SL positioning to the location server LMF 608.

Figure 7:
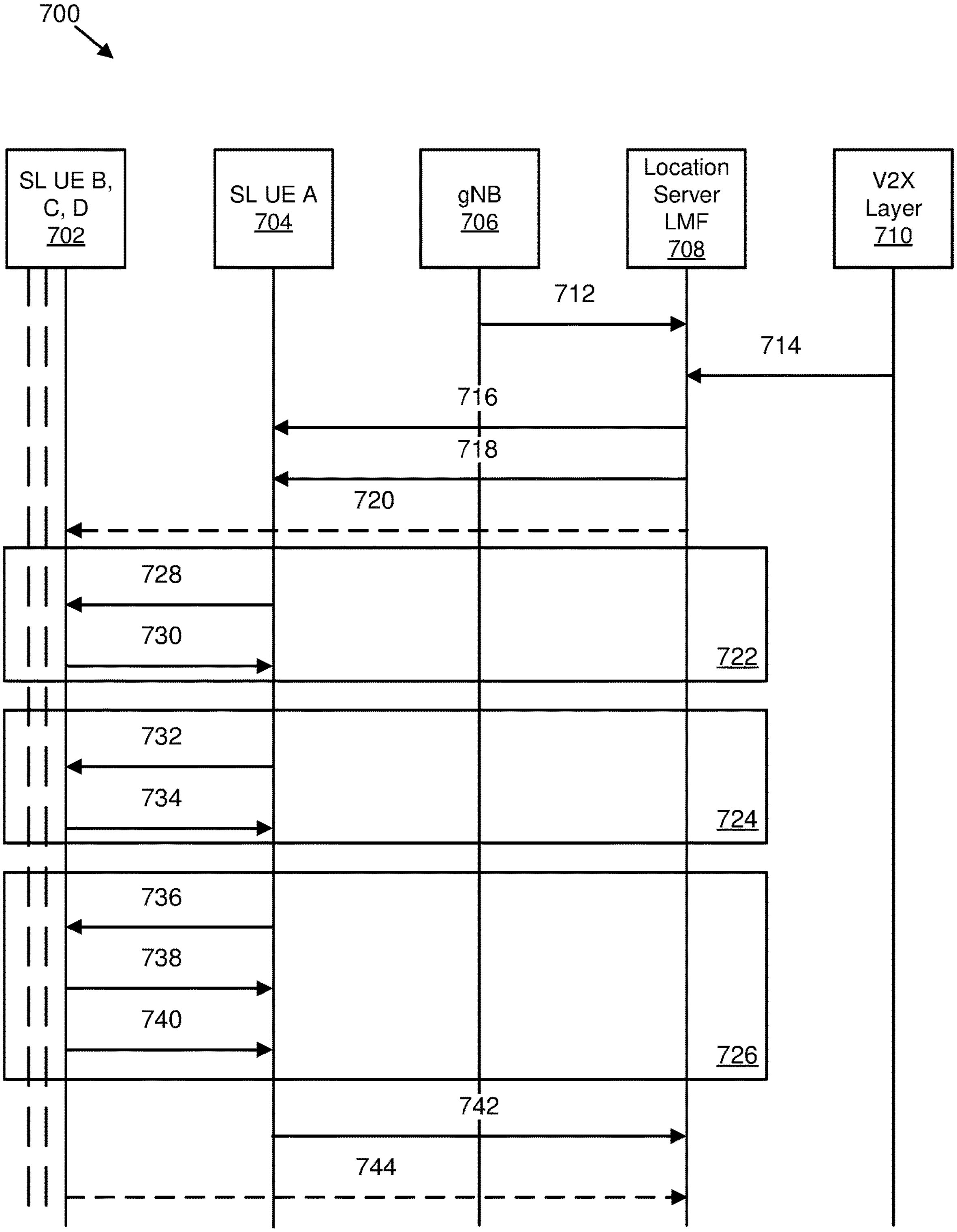
FIG. 7 is a network communication diagram illustrating one embodiment of UE based positioning.

FIG. 7 is a network communication diagram 700 illustrating one embodiment of UE based positioning. The diagram 700 illustrates a SL UE B, C, and/or D 702, a SL UE A 704, a gNB 706, a location server LMF 708, and a V2X layer 710. As may be appreciated, each of the illustrated messages may include one or more messages.

In a first communication 712 transmitted between the gNB 706 and the location server LMF 708, the gNB 706 transmits a SL resource pool configuration and/or SL RS (e.g., using an NRPPa protocol) to the location server LMF 708.

In a second communication 714 transmitted from the V2X layer 710 to the location server LMF 708, the V2X layer 710 transmits a group size, destination ID, member ID, and/or an MCR to the location server LMF 708.

In a third communication 716 transmitted from the location server LMF 708 to the SL UE A 704, the location server LMF 708 transmits a request for SL positioning (e.g., absolute and/or relative positioning model, NW and/or UE based source-destination IDs) (e.g., using an LPP protocol) to the SL UE A 704.

In a fourth communication 718 transmitted from the location server LMF 708 to the SL UE A 704, the location server LMF 708 transmits assistance information for SL positioning (e.g., SL RS, occasion, repetition, COMB pattern, subchannel size, BW, positioning technique, report type) (e.g., using an LPP protocol) to the SL UE A 704.

In an optional fifth communication 720 transmitted from the location server LMF 708 to the SL UE B, C, and/or D 702, the location server LMF 708 transmits assistance information for SL positioning (e.g., SL RS, occasion, repetition, COMB pattern, subchannel size, BW, positioning technique, report type) (e.g., using an LPP protocol) to the SL UE B, C, and/or D 702.

A model A 722, model B 724, and model C 726 are illustrated.

In a sixth communication 728 transmitted from the SL UE A 704 to the SL UE B, C, and/or D 702, the SL UE A 704 transmits a SL PRS transmission to the SL UE B, C, and/or D 702, and in a seventh communication 730 transmitted from the SL UE B, C, and/or D 702 to the SL UE A 704, the SL UE B, C, and/or D 702 transmits a position report to the SL UE A 704. The sixth communication 728 and the seventh communication 730 may be considered model A 722.

In an eighth communication 732 transmitted from the SL UE A 704 to the SL UE B, C, and/or D 702, the SL UE A 704 transmits a SL PRS transmission request and/or trigger to the SL UE B, C, and/or D 702, and in a nineth communication 734 transmitted from the SL UE B, C, and/or D 702 to the SL UE A 704, the SL UE B, C, and/or D 702 transmits a PRS transmission to the SL UE A 704. The eighth communication 732 and the nineth communication 734 may be considered model B 724.

In a tenth communication 736 transmitted from the SL UE A 704 to the SL UE B, C, and/or D 702, the SL UE A 704 transmits a SL PRS transmission and a SL PRS transmission request and/or trigger to the SL UE B, C, and/or D 702, in an eleventh communication 738 transmitted from the SL UE B, C, and/or D 702 to the SL UE A 704, the SL UE B, C, and/or D 702 transmits a PRS transmission to the SL UE A 704, and in a twelfth communication 740 transmitted from the SL UE B, C, and/or D 702 to the SL UE A 704, the SL UE B, C, and/or D 702 transmits a position report to the SL UE A 704. The tenth communication 736, the eleventh communication 738, and the twelfth communication 740 may be considered model C 726.

In a thirteenth communication 742 transmitted from the SL UE A 704 to the location server LMF 708, the SL UE A 704 transmits a report for SL positioning to the location server LMF 708. In an optional fourteenth communication 744 transmitted from the SL UE B, C, and/or D 702 to the location server LMF 708, the SL UE B, C, and/or D 702 transmits a report for SL positioning to the location server LMF 708.

In some embodiments, SL PRS repetition with beamforming per transmission occasion and a SL positioning technique per beam repetition for determining longitudinal or lateral positioning may be used. In various embodiments, SL PRS repetition per transmission occasion and SL positioning technique per beam repetition for determining two-dimensional ("2D") positioning, three-dimensional ("3D") positioning, elevation, and/or azimuth.

Figure 8:
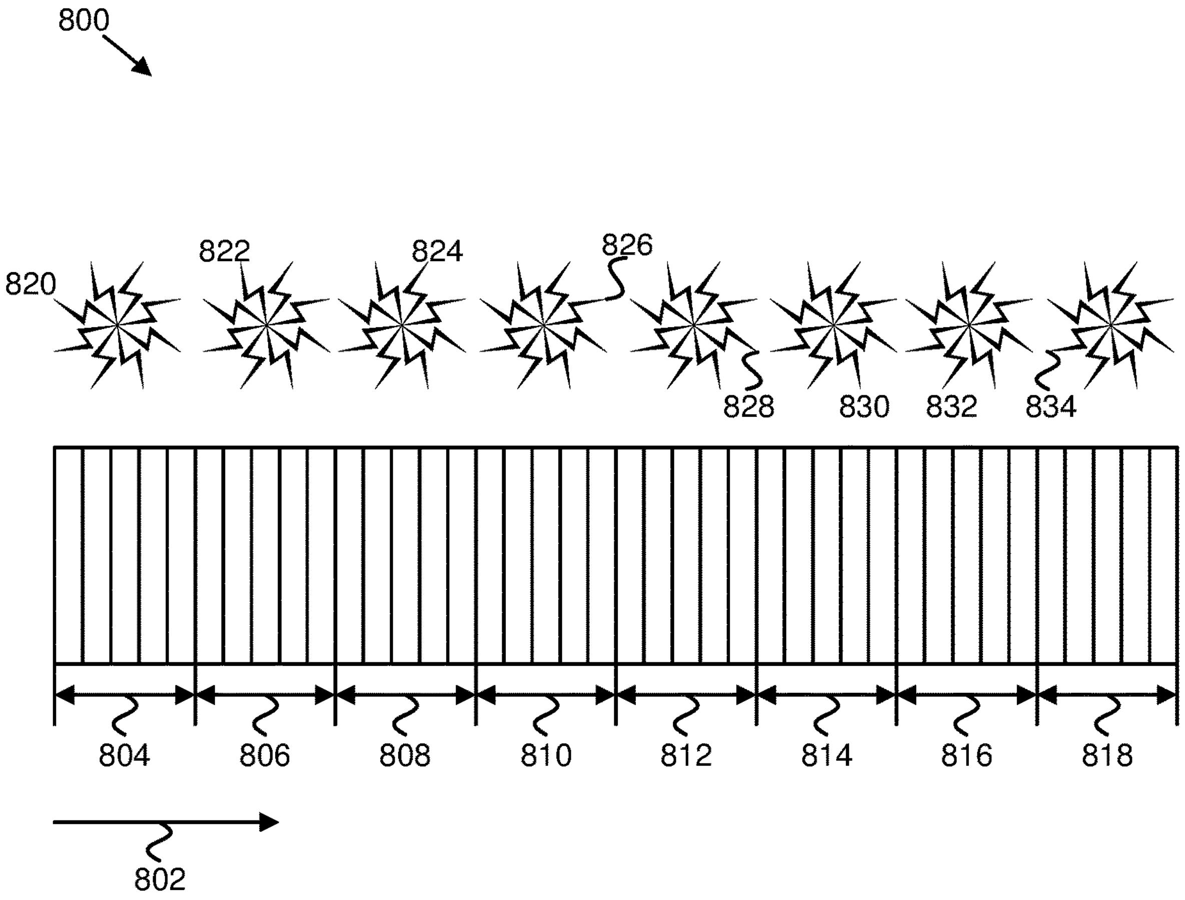
FIG. 8 is a timing diagram illustrating one embodiment of PRS transmission occasions.

FIG. 8 is a timing diagram 800 illustrating one embodiment of PRS transmission occasions. The timing diagram 800 is illustrated over time 802, and includes a first PRS occasion 804, a second PRS occasion 806, a third PRS occasion 808, a fourth PRS occasion 810, a fifth PRS occasion 812, a sixth PRS occasion 814, a seventh PRS occasion 816, and an eighth PRS occasion 818. The first PRS occasion 804 may use a first beam 820, the second PRS occasion 806 may use a second beam 822, the third PRS occasion 808 may use a third beam 824, the fourth PRS occasion 810 may use a fourth beam 826, the fifth PRS occasion 812 may use a fifth beam 828, the sixth PRS occasion 814 may use a sixth beam 830, the seventh PRS occasion 816 may use a seventh beam 832, and the eighth PRS occasion 818 may use an eighth beam 834.

Figure 9:
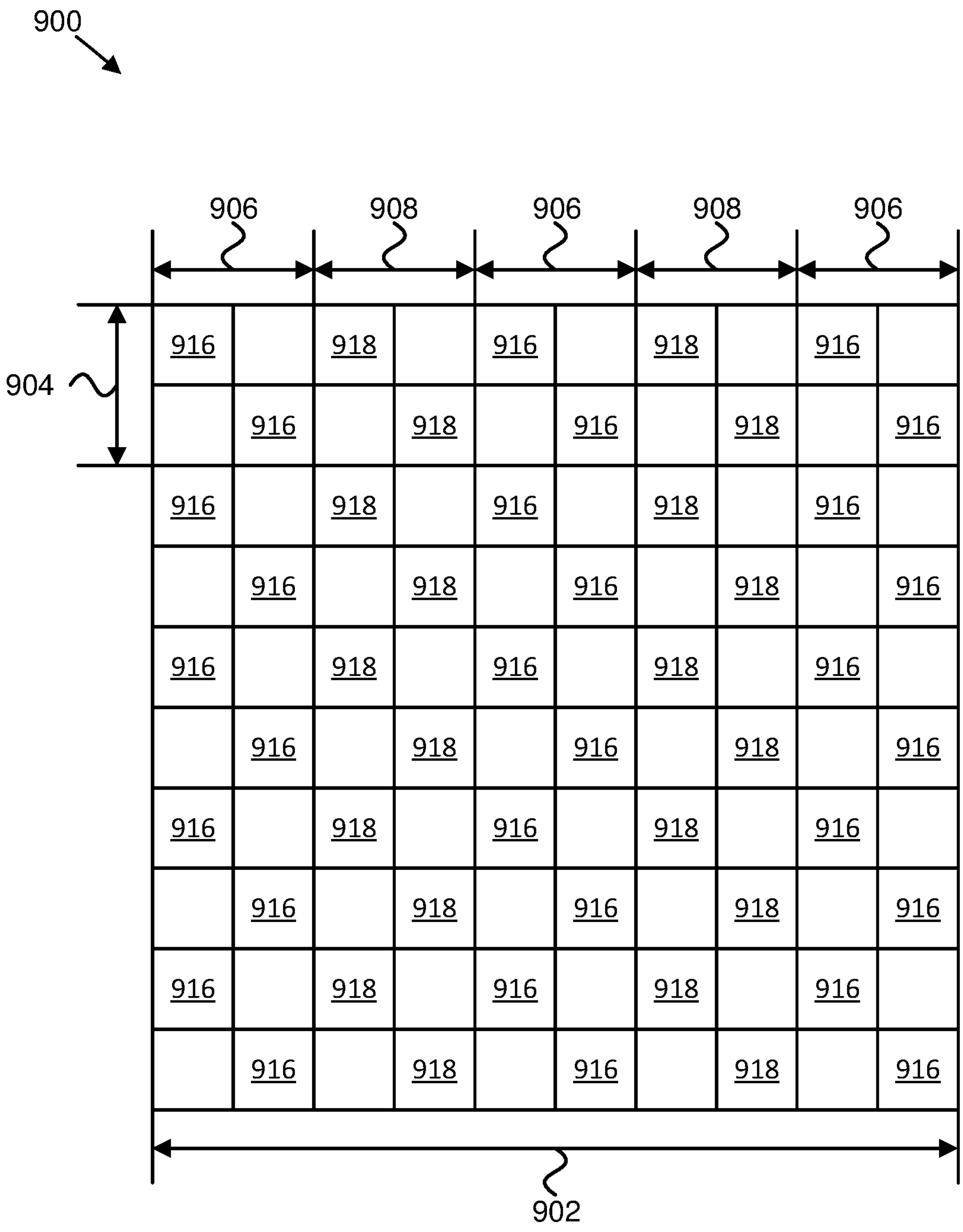
FIG. 9 is a schematic block diagram illustrating one embodiment of a PRS repetition configuration.

FIG. 9 is a schematic block diagram illustrating one embodiment of a PRS repetition configuration 900. The PRS repetition configuration 900 includes a PRS occasion 902, which includes a PRS sequence comb-2 pattern 904, a first PRS repetition pattern 906 (e.g., SL TDOA) and a second PRS repetition pattern 908 (e.g., SL AOD). The first PRS repetition pattern 906 includes a PRS repetition for SL TDOA measurements 916, and the second PRS repetition pattern 908 includes a PRS repetition for SL AOD measurements 918.

Figure 10:
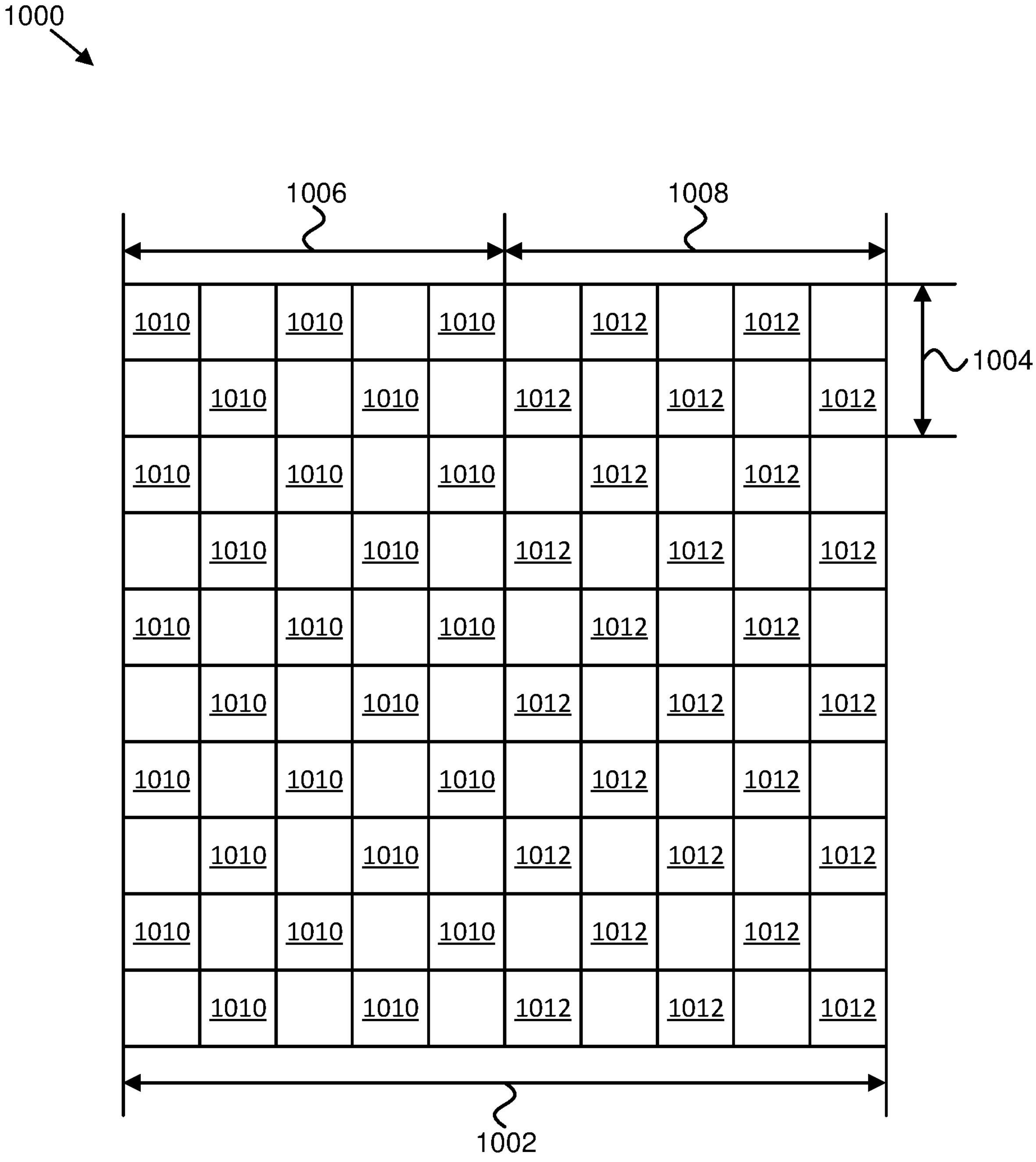
FIG. 10 is a schematic block diagram illustrating another embodiment of a PRS repetition configuration.

FIG. 10 is a schematic block diagram illustrating another embodiment of a PRS repetition configuration 1000. The PRS repetition configuration 1000 includes a PRS occasion 1002, which includes a PRS sequence comb-2 pattern 1004, a first PRS repetition pattern 1006 (e.g., SL-TDOA) and a second PRS repetition pattern 1008 (e.g., SL-AOD). The first PRS repetition pattern 1006 includes a PRS repetition for SL-TDOA measurements 1010, and the second PRS repetition pattern 1008 includes a PRS repetition for SL-AOD measurements 1012.

Figure 11:
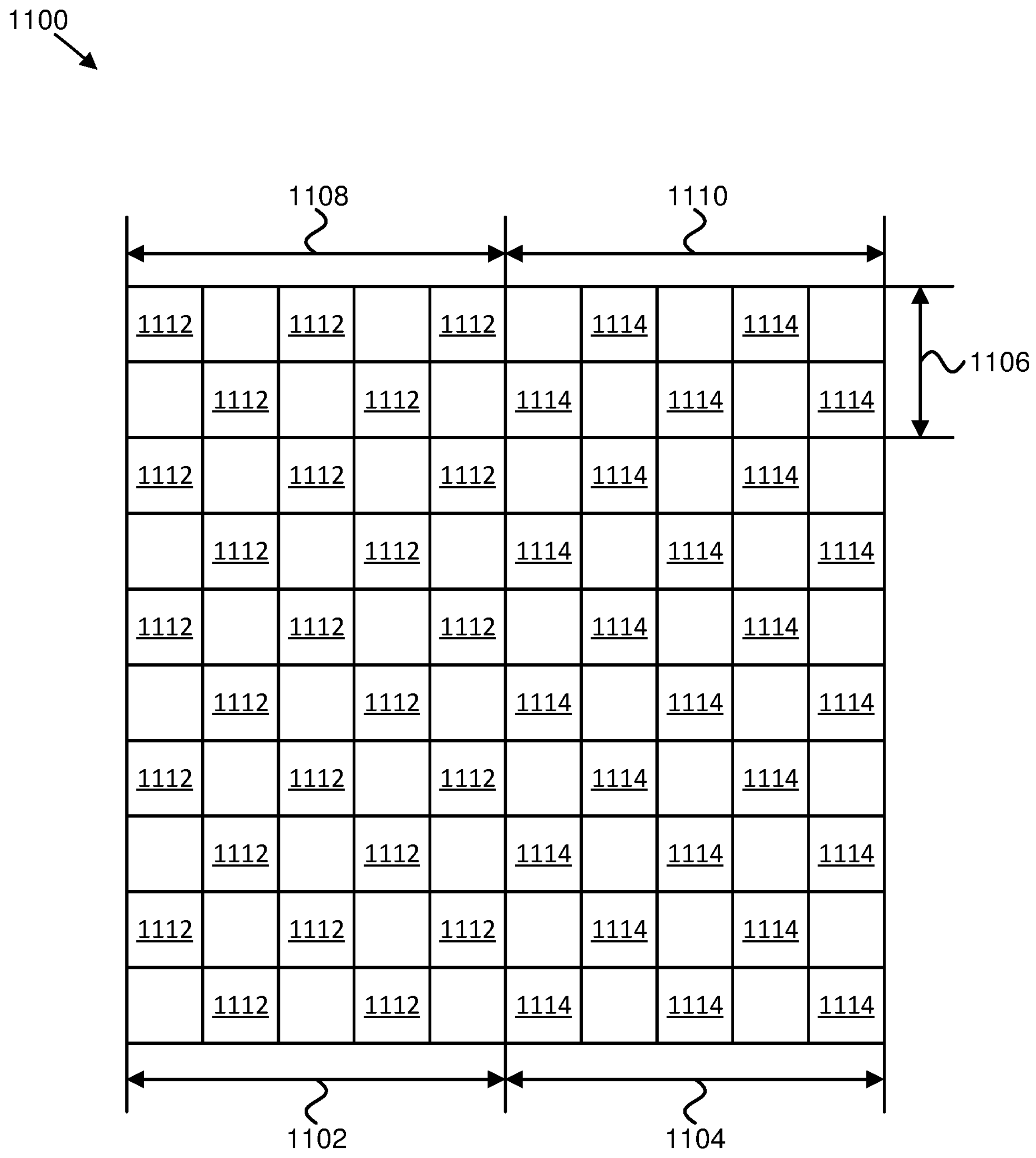
FIG. 11 is a schematic block diagram illustrating yet another embodiment of a PRS repetition configuration.

FIG. 11 is a schematic block diagram illustrating yet another embodiment of a PRS repetition configuration 1100. The PRS repetition configuration 1100 includes a first beam 1102 and a second beam 1104, and further includes a PRS sequence comb-2 pattern 1106, a first PRS resource set 1108 (e.g., SL-TDOA) and a second PRS resource set 1110 (e.g., SL-AOD). The first PRS resource set 1108 includes a PRS repetition for SL-TDOA measurements 1112, and the second PRS resource set 1108 includes a PRS repetition for SL-AOD measurements 1114.

In certain embodiments, a report configuration includes whether to report absolute positioning, absolute positioning+relative positioning, relative positioning, SL positioning technique, and/or whether the report is periodic or aperiodic. In some embodiments, one or more positioning methods and/or techniques with respect to a PRS resource set for longitudinal and lateral positioning estimates may be provided separately, and reporting may be configured to indicate whether to report longitudinal and/or lateral estimates, or both. SL assistance data may be applicable for both UE-assisted (e.g., see FIGS. 4, 5, and 6) and UE-based positioning (e.g., see FIG. 7).

In various embodiments, an LPP provides a threshold for positioning accuracy to help with anchor and non-anchor UE selection by a TX UE. In such embodiments, the TX UE may use a MCR value along with a threshold for positioning accuracy as one method for anchor UE selection process. Moreover, in such embodiments, the TX UE may transmit the MCR and/or a accuracy estimate in sidelink control information ("SCI"), a medium access control control element ("MAC CE"), or any higher layer signaling to RX UEs and RX UEs having a positioning accuracy less than or equal to a threshold may transmit its absolute positioning information to the TX UE for SL positioning estimates.

In certain embodiments, LPP signaling may be combined for a Uu and an SL positioning request and/or report.

In some embodiments, combined LPP signaling may be used to configure both Uu and SL based PRS transmission in respective Uu and SL slots. In such embodiments, a positioning request, UE assistance, and UE reporting may use combined LPP signaling which helps a network to determine a precise positioning between UEs using SL positioning techniques (e.g., in addition to a SL positioning technique).

In various embodiments, if a LMF wants to determine precise positioning between a first UE (e.g., UE A) and a second UE (e.g., UE B), then LPP signaling may contain UEA location information (e.g., which may be coarse) and the UEB may use a SL positioning technique to determine a precise positioning between UEA and UEB.

Figure 12:
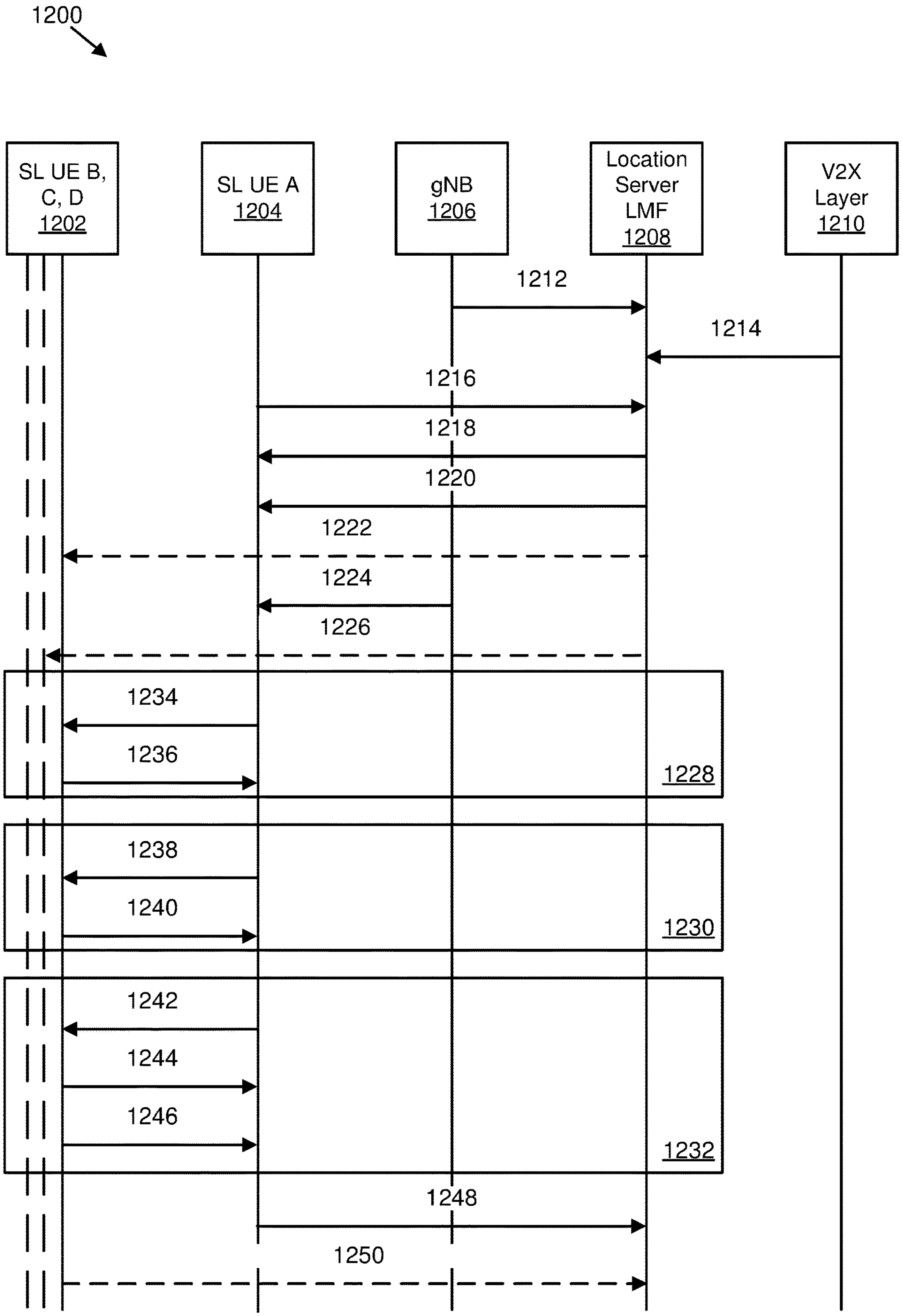
FIG. 12 is a timing diagram illustrating one embodiment of combined signal positioning.

FIG. 12 is a timing diagram 1200 illustrating one embodiment of combined signal positioning. The diagram 1200 illustrates a SL UE B, C, and/or D 1202, a SL UE A 1204, a gNB 1206, a location server LMF 1208, and a V2X layer 1210. As may be appreciated, each of the illustrated messages may include one or more messages.

In a first communication 1212 transmitted between the gNB 1206 and the location server LMF 1208, the gNB 1206 transmits a Uu PRS and SL resource pool configuration and/or SL RS (e.g., using an NRPPa protocol) to the location server LMF 1208.

In a second communication 1214 transmitted from the V2X layer 1210 to the location server LMF 1208, the V2X layer 1210 transmits a group size, destination ID, member ID, and/or an MCR to the location server LMF 1208.

In a third communication 1216 transmitted from the SL UE A 1204 to the location server LMF 1208, the SL UE A 1204 transmits UE assistance information for SL positioning (e.g., onboard metrics such as velocity, speed, heading, neighboring UEs, and so forth) (e.g., using an LPP protocol) to the location server LMF 1208.

In a fourth communication 1218 transmitted from the location server LMF 1208 to the SL UE A 1204, the location server LMF 1208 transmits a request for SL positioning (e.g., absolute and/or relative positioning model, NW and/or UE based source-destination IDs) (e.g., using an LPP protocol) to the SL UE A 1204.

In a fifth communication 1220 transmitted from the location server LMF 1208 to the SL UE A 1204, the location server LMF 1208 transmits assistance information for SL positioning (e.g., SL RS, occasion, repetition, COMB pattern, subchannel size, BW, positioning technique, report type) (e.g., using an LPP protocol) to the SL UE A 1204.

In an optional sixth communication 1222 transmitted from the location server LMF 1208 to the SL UE B, C, and/or D 1202, the location server LMF 1208 transmits assistance information for SL positioning (e.g., SL RS, occasion, repetition, COMB pattern, subchannel size, BW, positioning technique, report type) (e.g., using an LPP protocol) to the SL UE B, C, and/or D 1202.

In a seventh communication 1224 transmitted from the gNB 1206 to the SL UE A 1204, the gNB 1206 transmits DL PRS to the SL UE A 1204. Moreover, in an optional eighth communication 1226 transmitted from the gNB 1206 to the SL UE B, C, and/or D 1202, the gNB 1206 transmits DL PRS to the SL UE B, C, and/or D 1202.

A model A 1228, model B 1230, and model C 1232 are illustrated.

In a nineth communication 1234 transmitted from the SL UE A 1204 to the SL UE B, C, and/or D 1202, the SL UE A 1204 transmits a SL PRS transmission to the SL UE B, C, and/or D 1202, and in a tenth communication 1236 transmitted from the SL UE B, C, and/or D 1202 to the SL UE A 1204, the SL UE B, C, and/or D 1202 transmits a position report to the SL UE A 1204. The nineth communication 1234 and the tenth communication 1236 may be considered model A 1228.

In an eleventh communication 1238 transmitted from the SL UE A 1204 to the SL UE B, C, and/or D 1202, the SL UE A 1204 transmits a SL PRS transmission request and/or trigger to the SL UE B, C, and/or D 1202, and in a twelfth communication 1240 transmitted from the SL UE B, C, and/or D 1202 to the SL UE A 1204, the SL UE B, C, and/or D 1202 transmits a PRS transmission to the SL UE A 1204. The eleventh communication 1238 and the twelfth communication 1240 may be considered model B 1230.

In a thirteenth communication 1242 transmitted from the SL UE A 1204 to the SL UE B, C, and/or D 1202, the SL UE A 1204 transmits a SL PRS transmission and a SL PRS transmission request and/or trigger to the SL UE B, C, and/or D 1202, in a fourteenth communication 1244 transmitted from the SL UE B, C, and/or D 1202 to the SL UE A 1204, the SL UE B, C, and/or D 1202 transmits a PRS transmission to the SL UE A 1204, and in a fifteenth communication 1246 transmitted from the SL UE B, C, and/or D 1202 to the SL UE A 1204, the SL UE B, C, and/or D 1202 transmits a position report to the SL UE A 1204. The thirteenth communication 1242, the fourteenth communication 1244, and the fifteenth communication 1246 may be considered model C 1232.

In a sixteenth communication 1248 transmitted from the SL UE A 1204 to the location server LMF 1208, the SL UE A 1204 transmits a report for Uu and SL positioning to the location server LMF 1208. In an optional seventeenth communication 1250 transmitted from the SL UE B, C, and/or D 1202 to the location server LMF 1208, the SL UE B, C, and/or D 1202 transmits a report for Uu and SL positioning to the location server LMF 1208.

In various embodiments, there may be Uu reference timing for SL PRS transmission.

In certain embodiments, a calibration step may be performed in sidelink to synchronize UEs belonging to different synchronization sources to a common synchronization timing, a calibration step may be performed periodically or may be triggered aperiodically depending on a calculated positioning error or it may be triggered to be performed by LPP, agNB, or a TX UE based on a network based or a UE based positioning method.

In some embodiments, calibration may be performed using different methods. In such embodiments, based on a UE based positioning technique, a measurement from DL PRS may be used as a common reference timing for SL PRS transmission and/or reception. In various embodiments, combined DL and SL positioning related signaling framework may be used as a baseline. In certain embodiments, LPP signaling may indicate a common synchronization source to be used for SL PRS transmission. In some embodiments, a synchronization source may be different from sidelink synchronization signal ("SLSS") transmission and/or reception.

In various embodiments, a gNB may provide additional information in common radio resource control ("RRC") signaling (e.g., via system information broadcast) about calibration offset values with respect to each synchronization source. In some embodiments, offset values may be provided with respect to a number of symbols, a microsecond, and/or a nanosecond, and reference timing and/or numerology for the offset may be calculated with respect to a coreset 0 and/or a physical broadcast channel ("PBCH").

In certain embodiments, calculation based on a round trip time ("RTT") may be performed between SL UEs (e.g., source destinations before or during actual SL PRS transmission and/or reception).

In some embodiments, message exchange based RTT calculation may be performed by exchanging timing information between TX and receive ("RX") UEs. In such embodiments, a TX UE includes time stamp information either in SCI, a MAC CE, a packet data convergence protocol ("PDCP"), radio link control ("RLC") headers, and/or control protocol data units ("PDUs") where it may be groupcast or unicast based on one-to-one and/or one-to-many calculations of SL positioning. In various embodiments, an RX UE, after receiving a time stamp, calculates its own time stamp and transmits it to a TX UE. In such embodiments, the TX UE may estimate a round-trip time and calibrate synchronization timing.

In some embodiments, SL PRS exchanged between TX and RX UEs (e.g., between source-destinations as part of model C) may be used to calculate and calibrate a synchronization timing.

In various embodiments, message exchange based RTT may be done together with a SL PRS transmission and reception to calibrate synchronization timing.

Figure 13:
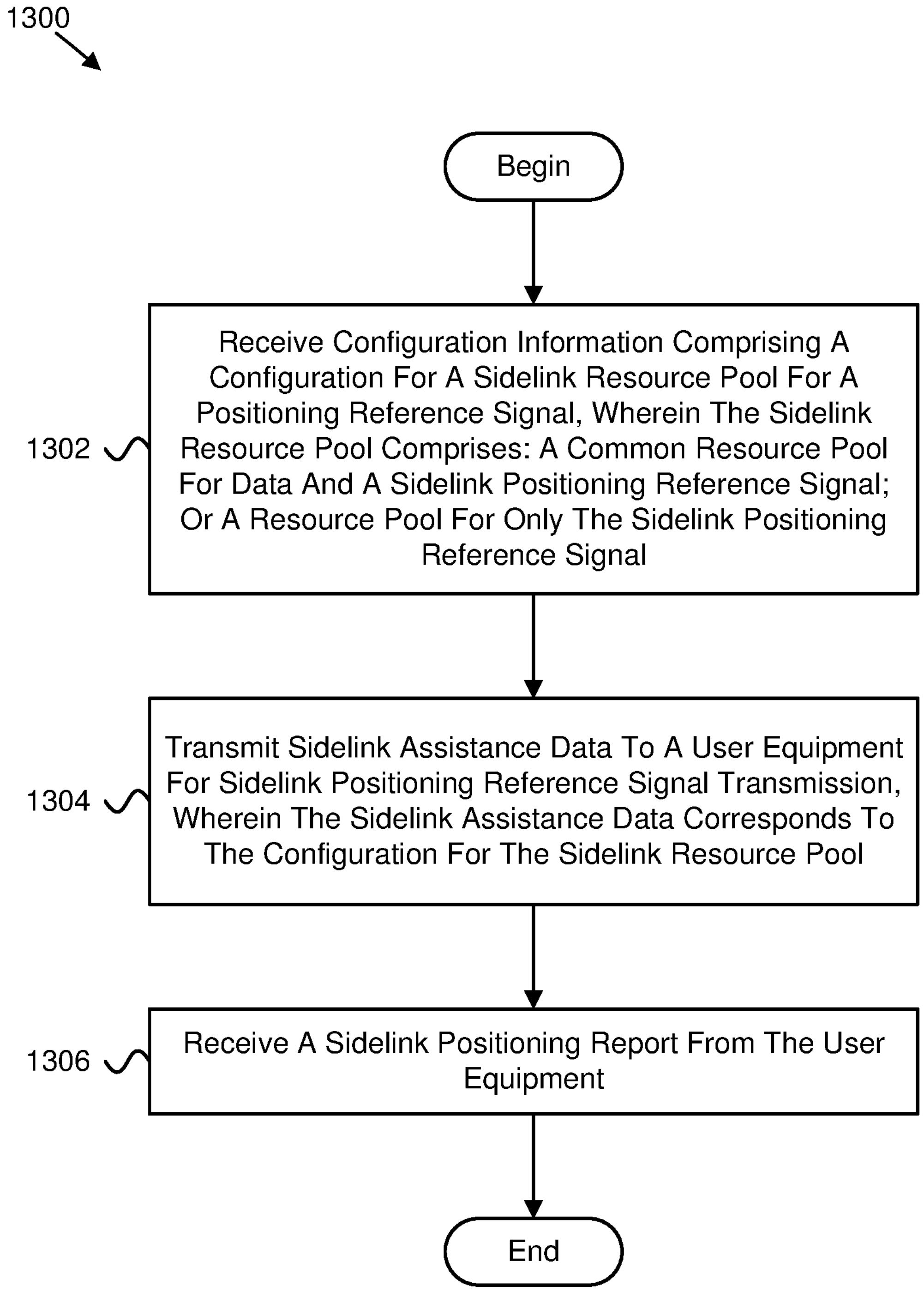
FIG. 13 is a flow chart diagram illustrating one embodiment of a method for sidelink resource pool configuration.

FIG. 13 is a flow chart diagram illustrating one embodiment of a method 1300 for sidelink resource pool configuration. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes receiving 1302 configuration information including a configuration for a sidelink resource pool for a positioning reference signal. The sidelink resource pool includes: a common resource pool for data and a sidelink positioning reference signal; or a resource pool for only the sidelink positioning reference signal. In some embodiments, the method 1300 includes transmitting 1304 sidelink assistance data to a user equipment for sidelink positioning reference signal transmission. The sidelink assistance data corresponds to the configuration for the sidelink resource pool. In certain embodiments, the method 1300 includes receiving 1306 a sidelink positioning report from the user equipment.

In certain embodiments, the configuration information is received from a base station. In some embodiments, the sidelink assistance data includes a bandwidth for each carrier. In various embodiments, the sidelink assistance data includes a number of symbols used in a slot for a sidelink positioning reference signal transmission, a frequency offset, a periodicity, a repetition pattern, a repetition factor, transmit power parameters, and/or a muting pattern.

In one embodiment, the method 1300 further includes receiving a destination identifier, a destination group identifier, a group size, and/or a member identifier from a vehicle to everything layer. In certain embodiments, the sidelink assistance data is transmitted via a unicast transmission, a groupcast transmission, or a broadcast transmission. In some embodiments, the sidelink assistance data comprises a mapping between positioning accuracy, latency, priority, and remaining packet delay budget.

In various embodiments, the sidelink assistance data includes sidelink positioning reference signal transmission occasions per resource pool, a number of subchannels of sidelink positioning reference signal transmissions per resource pool, a sidelink positioning technique, a sidelink positioning type, a report configuration, source-destination identifier information for sidelink positioning reference signal transmission, a source-destination group identifier, a minimum communication range, and/or an anchor user equipment's positioning information. In one embodiment, the sidelink positioning type includes information indicating a one-to-one sidelink positioning reference signal transmission, a one-to-many sidelink positioning reference signal transmission, a many-to-one sidelink positioning reference signal transmission, or a bidirectional sidelink positioning reference signal transmission. In certain embodiments, the report configuration indicates whether to report absolute positioning, absolute positioning plus relative positioning, relative positioning, a sidelink positioning technique, periodic transmission, aperiodic transmission, a positioning method, a positioning technique, whether to report longitudinal estimates, and/or whether to report lateral estimates.

In some embodiments, the sidelink assistance data indicates a sidelink positioning reference signal repetition per transmission occasion, and/or a sidelink positioning technique per beam repetition. In various embodiments, the sidelink assistance data includes a threshold for positioning accuracy to facilitate anchor user equipment and non-anchor user equipment selection, and/or a threshold for positioning accuracy.

Figure 14:
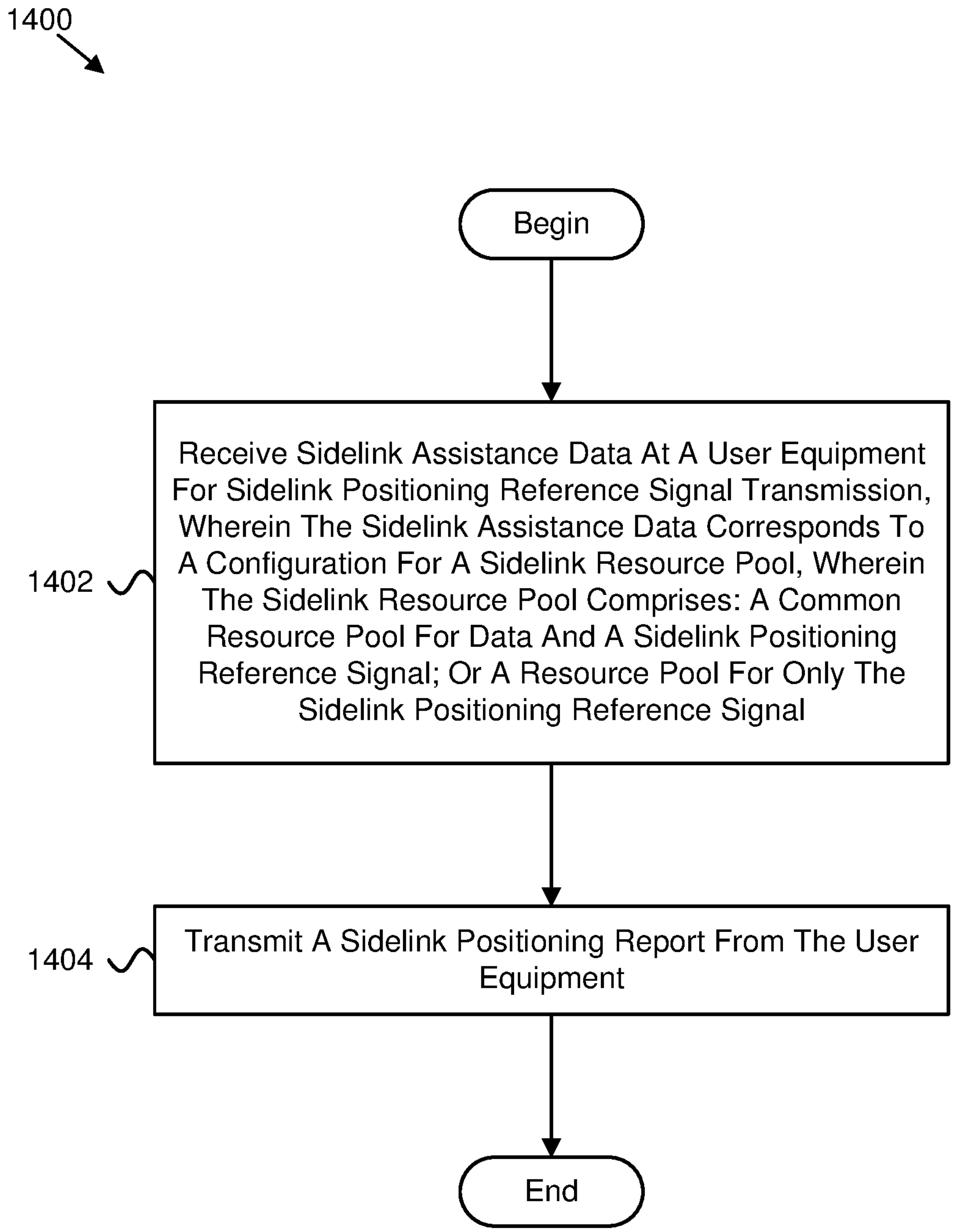
FIG. 14 is a flow chart diagram illustrating another embodiment of a method for sidelink resource pool configuration.

FIG. 14 is a flow chart diagram illustrating one embodiment of a method 1400 for sidelink resource pool configuration. In some embodiments, the method 1400 is performed by an apparatus, such as the remote unit 102. In certain embodiments, the method 1400 may be performed by a processor executing program code, for example, a microcontroller, a microprocessor, a CPU, a GPU, an auxiliary processing unit, a FPGA, or the like.

In various embodiments, the method 1400 includes receiving 1402 sidelink assistance data at a user equipment for sidelink positioning reference signal transmission. The sidelink assistance data corresponds to a configuration for a sidelink resource pool. The sidelink resource pool includes: a common resource pool for data and a sidelink positioning reference signal; or a resource pool for only the sidelink positioning reference signal. In some embodiments, the method 1700 includes transmitting 1404 a sidelink positioning report from the user equipment.

In certain embodiments, the sidelink assistance data includes a bandwidth for each carrier. In some embodiments, the sidelink assistance data comprises a number of symbols used in a slot for a sidelink positioning reference signal transmission, a frequency offset, a periodicity, a repetition pattern, a repetition factor, transmit power parameters, and/or a muting pattern. In various embodiments, the sidelink assistance data is received via a unicast transmission, a groupcast transmission, or a broadcast transmission.

In one embodiment, the sidelink assistance data includes a mapping between positioning accuracy, latency, priority, and remaining packet delay budget. In certain embodiments, the sidelink assistance data includes sidelink positioning reference signal transmission occasions per resource pool, a number of subchannels of sidelink positioning reference signal transmissions per resource pool, a sidelink positioning technique, a sidelink positioning type, a report configuration, source-destination identifier information for sidelink positioning reference signal transmission, a source-destination group identifier, a minimum communication range, and/or an anchor user equipment's positioning information. In some embodiments, the sidelink positioning type includes information indicating a one-to-one sidelink positioning reference signal transmission, a one-to-many sidelink positioning reference signal transmission, a many-to-one sidelink positioning reference signal transmission, or a bidirectional sidelink positioning reference signal transmission.

In various embodiments, the report configuration indicates whether to report absolute positioning, absolute positioning plus relative positioning, relative positioning, a sidelink positioning technique, periodic transmission, aperiodic transmission, a positioning method, a positioning technique, whether to report longitudinal estimates, and/or whether to report lateral estimates. In one embodiment, the sidelink assistance data indicates a sidelink positioning reference signal repetition per transmission occasion, and/or a sidelink positioning technique per beam repetition. In certain embodiments, the sidelink assistance data includes a threshold for positioning accuracy to facilitate anchor user equipment and non-anchor user equipment selection, and/or a threshold for positioning accuracy.

In one embodiment, a method comprises: receiving configuration information comprising a configuration for a sidelink resource pool for a positioning reference signal, wherein the sidelink resource pool comprises: a common resource pool for data and a sidelink positioning reference signal; or a resource pool for only the sidelink positioning reference signal; transmitting sidelink assistance data to a user equipment for sidelink positioning reference signal transmission, wherein the sidelink assistance data corresponds to the configuration for the sidelink resource pool; and receiving a sidelink positioning report from the user equipment.

In certain embodiments, the configuration information is received from a base station.

In some embodiments, the sidelink assistance data comprises a bandwidth for each carrier.

In various embodiments, the sidelink assistance data comprises a number of symbols used in a slot for a sidelink positioning reference signal transmission, a frequency offset, a periodicity, a repetition pattern, a repetition factor, transmit power parameters, a muting pattern, or some combination thereof.

In one embodiment, the method further comprises receiving a destination identifier, a destination group identifier, a group size, a member identifier, or some combination thereof from a vehicle to everything layer.

In certain embodiments, the sidelink assistance data is transmitted via a unicast transmission, a groupcast transmission, or a broadcast transmission.

In some embodiments, the sidelink assistance data comprises a mapping between positioning accuracy, latency, priority, and remaining packet delay budget.

In various embodiments, the sidelink assistance data comprises sidelink positioning reference signal transmission occasions per resource pool, a number of subchannels of sidelink positioning reference signal transmissions per resource pool, a sidelink positioning technique, a sidelink positioning type, a report configuration, source-destination identifier information for sidelink positioning reference signal transmission, a source-destination group identifier, a minimum communication range, an anchor user equipment's positioning information, or some combination thereof.

In one embodiment, the sidelink positioning type comprises information indicating a one-to-one sidelink positioning reference signal transmission, a one-to-many sidelink positioning reference signal transmission, a many-to-one sidelink positioning reference signal transmission, or a bidirectional sidelink positioning reference signal transmission.

In certain embodiments, the report configuration indicates whether to report absolute positioning, absolute positioning plus relative positioning, relative positioning, a sidelink positioning technique, periodic transmission, aperiodic transmission, a positioning method, a positioning technique, whether to report longitudinal estimates, whether to report lateral estimates, or some combination thereof.

In some embodiments, the sidelink assistance data indicates a sidelink positioning reference signal repetition per transmission occasion, a sidelink positioning technique per beam repetition, or a combination thereof.

In various embodiments, the sidelink assistance data comprises a threshold for positioning accuracy to facilitate anchor user equipment and non-anchor user equipment selection, a threshold for positioning accuracy, or a combination thereof.

In one embodiment, an apparatus comprises: a receiver that receives configuration information comprising a configuration for a sidelink resource pool for a positioning reference signal, wherein the sidelink resource pool comprises: a common resource pool for data and a sidelink positioning reference signal; or a resource pool for only the sidelink positioning reference signal; and a transmitter that transmits sidelink assistance data to a user equipment for sidelink positioning reference signal transmission, wherein the sidelink assistance data corresponds to the configuration for the sidelink resource pool; wherein the receiver receives a sidelink positioning report from the user equipment.

In certain embodiments, the configuration information is received from a base station.

In some embodiments, the sidelink assistance data comprises a bandwidth for each carrier.

In various embodiments, the sidelink assistance data comprises a number of symbols used in a slot for a sidelink positioning reference signal transmission, a frequency offset, a periodicity, a repetition pattern, a repetition factor, transmit power parameters, a muting pattern, or some combination thereof.

In one embodiment, the receiver receives a destination identifier, a destination group identifier, a group size, a member identifier, or some combination thereof from a vehicle to everything layer.

In certain embodiments, the sidelink assistance data is transmitted via a unicast transmission, a groupcast transmission, or a broadcast transmission.

In some embodiments, the sidelink assistance data comprises a mapping between positioning accuracy, latency, priority, and remaining packet delay budget.

In various embodiments, the sidelink assistance data comprises sidelink positioning reference signal transmission occasions per resource pool, a number of subchannels of sidelink positioning reference signal transmissions per resource pool, a sidelink positioning technique, a sidelink positioning type, a report configuration, source-destination identifier information for sidelink positioning reference signal transmission, a source-destination group identifier, a minimum communication range, an anchor user equipment's positioning information, or some combination thereof.

In one embodiment, the sidelink positioning type comprises information indicating a one-to-one sidelink positioning reference signal transmission, a one-to-many sidelink positioning reference signal transmission, a many-to-one sidelink positioning reference signal transmission, or a bidirectional sidelink positioning reference signal transmission.

In certain embodiments, the report configuration indicates whether to report absolute positioning, absolute positioning and relative positioning, relative positioning, a sidelink positioning technique, periodic transmission, aperiodic transmission, a positioning method, a positioning technique, whether to report longitudinal estimates, whether to report lateral estimates, or some combination thereof.

In some embodiments, the sidelink assistance data indicates a sidelink positioning reference signal repetition per transmission occasion, a sidelink positioning technique per beam repetition, or a combination thereof.

In various embodiments, the sidelink assistance data comprises a threshold for positioning accuracy to facilitate anchor user equipment and non-anchor user equipment selection, a threshold for positioning accuracy, or a combination thereof.

In one embodiment, a method comprises: receiving sidelink assistance data at a user equipment for sidelink positioning reference signal transmission, wherein the sidelink assistance data corresponds to a configuration for a sidelink resource pool, wherein the sidelink resource pool comprises: a common resource pool for data and a sidelink positioning reference signal; or a resource pool for only the sidelink positioning reference signal; and transmitting a sidelink positioning report from the user equipment.

In certain embodiments, the sidelink assistance data comprises a bandwidth for each carrier.

In some embodiments, the sidelink assistance data comprises a number of symbols used in a slot for a sidelink positioning reference signal transmission, a frequency offset, a periodicity, a repetition pattern, a repetition factor, transmit power parameters, a muting pattern, or some combination thereof.

In various embodiments, the sidelink assistance data is received via a unicast transmission, a groupcast transmission, or a broadcast transmission.

In one embodiment, the sidelink assistance data comprises a mapping between positioning accuracy, latency, priority, and remaining packet delay budget.

In certain embodiments, the sidelink assistance data comprises sidelink positioning reference signal transmission occasions per resource pool, a number of subchannels of sidelink positioning reference signal transmissions per resource pool, a sidelink positioning technique, a sidelink positioning type, a report configuration, source-destination identifier information for sidelink positioning reference signal transmission, a source-destination group identifier, a minimum communication range, an anchor user equipment's positioning information, or some combination thereof.

In some embodiments, the sidelink positioning type comprises information indicating a one-to-one sidelink positioning reference signal transmission, a one-to-many sidelink positioning reference signal transmission, a many-to-one sidelink positioning reference signal transmission, or a bidirectional sidelink positioning reference signal transmission.

In various embodiments, the report configuration indicates whether to report absolute positioning, absolute positioning plus relative positioning, relative positioning, a sidelink positioning technique, periodic transmission, aperiodic transmission, a positioning method, a positioning technique, whether to report longitudinal estimates, whether to report lateral estimates, or some combination thereof.

In one embodiment, the sidelink assistance data indicates a sidelink positioning reference signal repetition per transmission occasion, a sidelink positioning technique per beam repetition, or a combination thereof.

In certain embodiments, the sidelink assistance data comprises a threshold for positioning accuracy to facilitate anchor user equipment and non-anchor user equipment selection, a threshold for positioning accuracy, or a combination thereof.

In one embodiment, an apparatus comprises a user equipment, the apparatus further comprises: a receiver that receives sidelink assistance data at the user equipment for sidelink positioning reference signal transmission, wherein the sidelink assistance data corresponds to a configuration for a sidelink resource pool, wherein the sidelink resource pool comprises: a common resource pool for data and a sidelink positioning reference signal; or a resource pool for only the sidelink positioning reference signal; and a transmitter that transmits a sidelink positioning report from the user equipment.

In certain embodiments, the sidelink assistance data comprises a bandwidth for each carrier.

In some embodiments, the sidelink assistance data comprises a number of symbols used in a slot for a sidelink positioning reference signal transmission, a frequency offset, a periodicity, a repetition pattern, a repetition factor, transmit power parameters, a muting pattern, or some combination thereof.

In various embodiments, the sidelink assistance data is received via a unicast transmission, a groupcast transmission, or a broadcast transmission.

In one embodiment, the sidelink assistance data comprises a mapping between positioning accuracy, latency, priority, and remaining packet delay budget.

In certain embodiments, the sidelink assistance data comprises sidelink positioning reference signal transmission occasions per resource pool, a number of subchannels of sidelink positioning reference signal transmissions per resource pool, a sidelink positioning technique, a sidelink positioning type, a report configuration, source-destination identifier information for sidelink positioning reference signal transmission, a source-destination group identifier, a minimum communication range, an anchor user equipment's positioning information, or some combination thereof.

In some embodiments, the sidelink positioning type comprises information indicating a one-to-one sidelink positioning reference signal transmission, a one-to-many sidelink positioning reference signal transmission, a many-to-one sidelink positioning reference signal transmission, or a bidirectional sidelink positioning reference signal transmission.

In various embodiments, the report configuration indicates whether to report absolute positioning, absolute positioning plus relative positioning, relative positioning, a sidelink positioning technique, periodic transmission, aperiodic transmission, a positioning method, a positioning technique, whether to report longitudinal estimates, whether to report lateral estimates, or some combination thereof.

In one embodiment, the sidelink assistance data indicates a sidelink positioning reference signal repetition per transmission occasion, a sidelink positioning technique per beam repetition, or a combination thereof.

In certain embodiments, the sidelink assistance data comprises a threshold for positioning accuracy to facilitate anchor user equipment and non-anchor user equipment selection, a threshold for positioning accuracy, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving, from a network device, a configuration for a sidelink resource pool for sidelink positioning comprising a common resource pool for the sidelink positioning and sidelink data; and transmitting, to another UE, sidelink assistance data for the sidelink positioning in a single message, wherein the sidelink assistance data corresponds to the configuration for the sidelink resource pool, and wherein the sidelink assistance data comprises source-destination information, a sidelink positioning type, and priority information, wherein the sidelink positioning type corresponds to a selected transmission type from a plurality of candidate transmission types, the plurality of candidate transmission types comprising: a one-to-one sidelink positioning transmission, a one-to-many sidelink positioning transmission, a many-to-one sidelink positioning transmission, and a bidirectional sidelink positioning transmission;

receiving one or more position reports associated with the sidelink positioning and in accordance with the sidelink positioning type; and transmitting, to the network device, a report for the sidelink positioning, wherein the report for the sidelink positioning is based on the received one or more position reports.

2. The method of claim 1, wherein the configuration further indicates sidelink positioning occasions per resource pool.

3. The method of claim 1, wherein the configuration is received from a base station.

4. The method of claim 1, wherein the sidelink assistance data indicates one or more of a number of symbols in a slot for sidelink positioning, a frequency offset, a periodicity, a repetition pattern, a repetition factor, a transmit power parameter, or a muting pattern.

5. The method of claim 1, wherein the sidelink assistance data is transmitted via a unicast transmission, a groupcast transmission, or a broadcast transmission.

6. The method of claim 1, wherein the sidelink assistance data indicates a mapping between one or more of a positioning accuracy, a latency, a priority, or remaining packet delay budget.

7. The method of claim 1, wherein the sidelink assistance data further indicates one or more of whether to report one or more of absolute positioning, absolute positioning plus relative positioning, relative positioning, a sidelink positioning technique, periodic transmission, aperiodic transmission, a positioning method, a positioning technique, whether to report longitudinal estimates, or whether to report lateral estimates.

8. A method performed by a user equipment (UE), the method comprising:

receiving, from another UE, sidelink assistance data for sidelink positioning in a single message, wherein the sidelink assistance data corresponds to a configuration for the sidelink resource pool, and wherein the sidelink assistance data comprises source-destination information, a sidelink positioning type, and priority information, wherein the sidelink positioning type corresponds to a selected transmission type from a plurality of candidate transmission types, the plurality of candidate transmission types comprising: a one-to-one sidelink positioning transmission, a one-to-many sidelink positioning transmission, a many-to-one sidelink positioning transmission, and a bidirectional sidelink positioning transmission;

generating a position report associated with the sidelink positioning and in accordance with the sidelink positioning type; and transmitting, to the another UE, the position report.

9. The method of claim 8, wherein the sidelink assistance data indicates one or more of a number of symbols in a slot for sidelink positioning, a frequency offset, a periodicity, a repetition pattern, a repetition factor, a transmit power parameter, or a muting patten.

10. A user equipment (UE), comprising:

at least one memory; and at least one processor coupled with the at least one memory and configured to cause the UE to:

receive, from a network device, a configuration for a sidelink resource pool for sidelink positioning comprising a common resource pool for the sidelink positioning and sidelink data; and transmit, to another UE, sidelink assistance data for the sidelink positioning in a single message, wherein the sidelink assistance data corresponds to the configuration for the sidelink resource pool, and wherein the sidelink assistance data comprises source-destination information, a sidelink positioning type, and priority information, wherein the sidelink positioning type corresponds to a selected transmission type from a plurality of candidate transmission types, the plurality of candidate transmission types comprising: a one-to-one sidelink positioning transmission, a one-to-many sidelink positioning transmission, a many-to-one sidelink positioning transmission, and a bidirectional sidelink positioning transmission;

receive one or more position reports associated with the sidelink positioning and in accordance with the sidelink positioning type; and transmit, to the network device, a report for the sidelink positioning, wherein the report for the sidelink positioning is based on the received one or more position reports.

11. A user equipment (UE), comprising:

at least one memory; and at least one processor coupled with the at least one memory and configured to cause the UE to:

receive, from another UE, sidelink assistance data for sidelink positioning in a single message, wherein the sidelink assistance data corresponds to a configuration for the sidelink resource pool, and wherein the sidelink assistance data comprises source-destination information, a sidelink positioning type, and priority information, wherein the sidelink positioning type corresponds to a selected transmission type from a plurality of candidate transmission types, the plurality of candidate transmission types comprising: a one-to-one sidelink positioning transmission, a one-to-many sidelink positioning transmission, a many-to-one sidelink positioning transmission, and a bidirectional sidelink positioning transmission;

generate a position report associated with the sidelink positioning and in accordance with the sidelink positioning type; and transmitting, to the another UE, the position report.

12. A base station, comprising:

at least one memory; and at least one processor coupled with the at least one memory and configured to cause the base station to:

transmit, to a user equipment (UE), a configuration for sidelink positioning, the configuration comprising sidelink assistance data and a sidelink resource pool for sidelink positioning comprising a common resource pool for sidelink positioning and sidelink data, wherein the sidelink assistance data corresponds to the sidelink resource pool, wherein the sidelink assistance data comprises source-destination information, a sidelink positioning type, and priority information, and wherein the sidelink positioning type corresponds to a selected transmission type from a plurality of candidate transmission types, the plurality of candidate transmission types comprising: a one-to-one sidelink positioning transmission, a one-to-many sidelink positioning transmission, a many-to-one sidelink positioning transmission, and a bidirectional sidelink positioning transmission; and receive, from the UE, a report for the sidelink positioning in accordance with the configuration.

13. A method performed by a base station, the method comprising:

transmitting, to a user equipment (UE), a configuration for sidelink positioning, the configuration comprising sidelink assistance data and a sidelink resource pool for sidelink positioning comprising a common resource pool for sidelink positioning and sidelink data, wherein the sidelink assistance data corresponds to the sidelink resource pool, wherein the sidelink assistance data comprises source-destination information, a sidelink positioning type, and priority information, and wherein the sidelink positioning type corresponds to a selected transmission type from a plurality of candidate transmission types, the plurality of candidate transmission types comprising: a one-to-one sidelink positioning transmission, a one-to-many sidelink positioning transmission, a many-to-one sidelink positioning transmission, and a bidirectional sidelink positioning transmission; and receiving, from the UE, a report for the sidelink positioning in accordance with the configuration.

* * * * *